United States Patent
Yamakawa et al.

(10) Patent No.: US 8,150,597 B2
(45) Date of Patent: Apr. 3, 2012

(54) METHOD AND SYSTEM FOR CONTROLLING AN INTERNAL COMBUSTION ENGINE

(75) Inventors: Masahisa Yamakawa, Hiroshima (JP); Toshiaki Nishimoto, Hiroshima (JP); Hirokazu Matsuura, Higashihiroshima (JP); Takashi Youso, Hiroshima (JP); Kouji Shishime, Hiroshima (JP); Mikinori Ohashi, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 640 days.

(21) Appl. No.: 12/391,974

(22) Filed: Feb. 24, 2009

(65) Prior Publication Data

US 2009/0216427 A1    Aug. 27, 2009

(30) Foreign Application Priority Data

Feb. 26, 2008  (JP) .................. 2008-044471
Feb. 26, 2008  (JP) .................. 2008-044474

(51) Int. Cl.
| G06F 19/00 | (2006.01) |
| F02D 13/02 | (2006.01) |
| F02D 41/10 | (2006.01) |
| F02B 75/12 | (2006.01) |
| F01L 1/34  | (2006.01) |

(52) U.S. Cl. ........ 701/103; 701/110; 123/348; 123/316; 123/403

(58) Field of Classification Search .............. 123/90.11, 123/90.15–90.18, 316, 347, 348, 399, 403; 701/101–103, 110, 113, 115
See application file for complete search history.

(56) References Cited

U.S. PATENT DOCUMENTS

| 4,494,506 | A  | * | 1/1985  | Hayama et al. ............... 123/348 |
| 4,519,355 | A  | * | 5/1985  | Fujimura et al. .............. 123/308 |
| 5,033,268 | A  | * | 7/1991  | Hitomi et al. ............. 123/184.53 |
| 5,161,497 | A  | * | 11/1992 | Simko et al. ................ 123/90.15 |
| 6,397,814 | B1 | * | 6/2002  | Nagaishi et al. ............... 123/348 |
| 6,499,469 | B2 | * | 12/2002 | Ogawa et al. .............. 123/90.15 |
| 6,626,164 | B2 |   | 9/2003  | Hitomi et al. |
| 7,295,912 | B2 | * | 11/2007 | Yasui et al. ................... 701/103 |
| 7,568,454 | B2 | * | 8/2009  | Yasui et al. ................ 123/90.15 |
| 2002/0166536 | A1 |   | 11/2002 | Hitomi et al. |

(Continued)

FOREIGN PATENT DOCUMENTS

DE    19847851    4/1999

(Continued)

OTHER PUBLICATIONS

ISA European Patent Office, Search Report of 09002672.5-1263, Jun. 23, 2009, Netherlands, 5 pages.

(Continued)

*Primary Examiner* — Willis Wolfe, Jr.
(74) *Attorney, Agent, or Firm* — Alleman Hall McCoy Russell & Tuttle LLP

(57) ABSTRACT

Methods and systems for controlling an internal combustion engine are provided. One example method may include closing an intake valve later during a cylinder cycle than a timing with which an amount of air inducted into a cylinder from an air intake passage would be maximized, and earlier during the cylinder cycle as a desired amount of air to be inducted into the cylinder increases, while an engine is operating at a given engine speed. The method may further include closing the intake valve earlier during a cylinder cycle as the engine speed increases when the desired amount of air to be inducted into the cylinder is at a maximum.

21 Claims, 16 Drawing Sheets

U.S. PATENT DOCUMENTS

2005/0087155 A1     4/2005    Kikori

FOREIGN PATENT DOCUMENTS

| | | |
|---|---|---|
| DE | 102004005751 | 8/2004 |
| EP | 0446065 | 9/1991 |
| EP | 1754872 | 2/2007 |
| GB | 2202001 | 9/1988 |
| JP | 59034434 A | 2/1984 |
| JP | 09170462 | 6/1997 |
| JP | 10252575 A | 9/1998 |
| JP | 2001207877 A | 8/2001 |
| JP | 2002038911 | 6/2002 |
| JP | 2002242709 A | 8/2002 |
| JP | 2002242711 | 8/2002 |
| JP | 2004218522 | 8/2004 |
| JP | 2005325818 A | 11/2005 |
| WO | 9950541 | 10/1999 |
| WO | 2007/132613 | 11/2007 |

OTHER PUBLICATIONS

ISA European Patent Office, Search Report of PCT/JP2007/058217, Dec. 28, 2007, 5 pages.

* cited by examiner

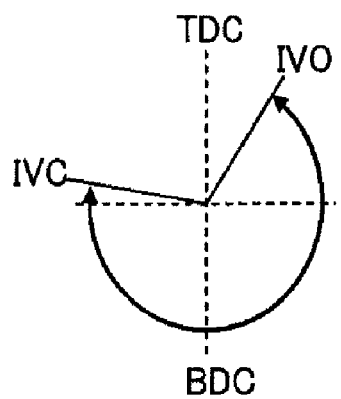
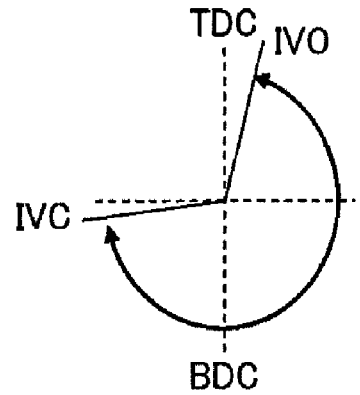
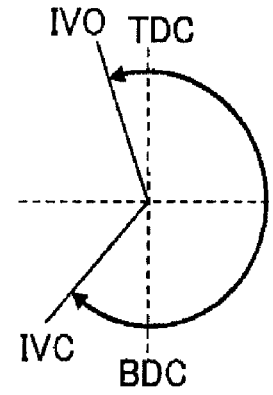
FIG. 5A        FIG. 5B        FIG. 5C
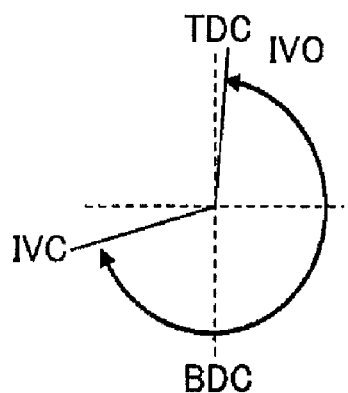
FIG. 5D

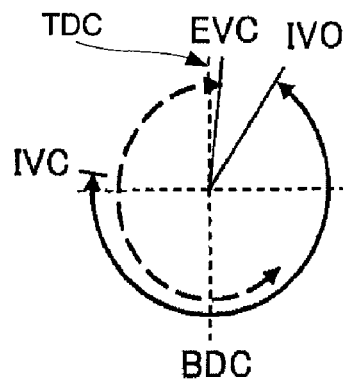
FIG. 13A
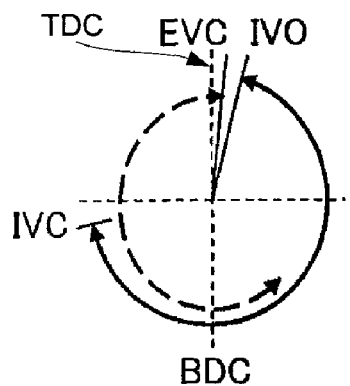 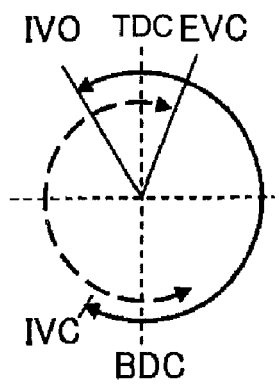 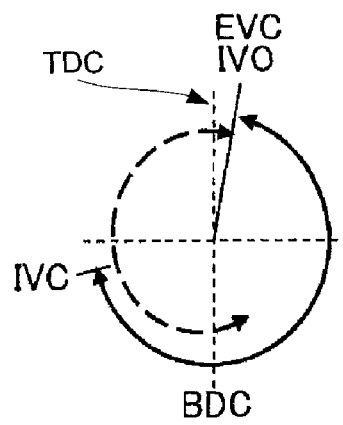
FIG. 13B          FIG. 13C          FIG. 13D

METHOD AND SYSTEM FOR CONTROLLING AN INTERNAL COMBUSTION ENGINE

TECHNICAL FIELD

The present description relates to a method of controlling an internal combustion engine. More particularly, the description pertains to a method for operating a closing timing for an intake valve capable of shutting off air flowing into a cylinder from an air intake passage in an internal combustion engine.

BACKGROUND AND SUMMARY

Recently, in order to improve emission characteristics etc., controlling opening and/or closing timing for an intake valve of an internal combustion engine according to operation conditions has been developed. One example of a method of operating an opening/closing timing for intake and exhaust valves is described by U.S. Pat. No. 6,626,164 B2. The method described in this reference closes an intake valve later during a cylinder cycle than a bottom dead center when an engine operates in medium-load range. On the other hand, when the engine operates in a full-load range, the method closes an intake valve earlier during a cylinder cycle than in a middle-load range. That is, the cylinder air charge amount is decreased by retarding a closing point of an intake valve as engine load is smaller. As a result, by using this method, a need for controlling an amount of inducted air will decrease, thereby pump loss accompanying pressure drop in an intake passage will decrease, and therefore pressure drop in a cylinder in an intake stroke is suppressed, which results in improved engine operating efficiency.

The method described in this reference also retards an opening timing for an intake valve as an engine speed increases within a range in which there is substantially no induced air blowing back through an inlet of a cylinder in an opposite direction when an engine operates in a full-load region.

The method described in the reference can increase engine output with improving operating efficiency of an internal combustion engine. However, increasing an expansion ratio of an internal combustion engine in order to further improve operating efficiency and output is difficult to achieve due to the following issues. Increasing a geometric compression ratio of an internal combustion engine is needed in order to increase an expansion ratio. When a geometric compression ratio of an internal combustion engine is high, if a cylinder air charge filling ratio is in a high range under a low engine speed condition (a condition where a number of rotations is in low range and gas-flow rate in a cylinder is in low range), an air-fuel mixture in the cylinder is over-heated in a compression stroke resulting in abnormal combustion. In the abnormal combustion, a phenomenon can occur, in which unburned air-fuel mixture is auto-ignited before spark ignition, or an unburned part of air-fuel mixture in the cylinder is over-compressed and auto-ignited after spark ignition due to excessive temperatures before flame propagation.

In view of this issue, one object of this invention is improving operating efficiency and output of an internal combustion engine without occurrence of an abnormal combustion.

One aspect of the present description includes a method of controlling an internal combustion engine, having a cylinder accommodating a piston which reciprocates therein, and defining a combustion chamber, an air intake passage through which air is inducted into said cylinder, and an intake valve capable of shutting off air flowing into said cylinder from said air intake passage. The method may include closing said intake valve later during a cylinder cycle than a timing with which an amount of air inducted into said cylinder from said air intake passage would be maximized, and earlier during the cylinder cycle as a desired amount of air to be inducted into said cylinder increases, while an engine is operating at a given engine speed. The method may further include closing said intake valve earlier during a cylinder cycle as the engine speed increases when said desired amount of air to be inducted into said cylinder is at a maximum.

This method overcomes at least some of the disadvantages of above references.

According to this method, in a high-load and low-speed range, an intake valve is closed later, during a cylinder cycle, than a timing with which an amount of air inducted into said cylinder from said air intake passage is maximized, which results in an intake valve being closed at a timing with which a substantial amount of air is blowing back to an intake passage from a cylinder. This makes it possible to avoid the occurrence of abnormal combustion, by decreasing the amount of air inducted into a cylinder without increasing pump loss due to throttle valve closing, within an engine operating range of high-load and low-speed where an abnormal combustion easily occurs. Further, abnormal combustion can be avoided even when a possibility of abnormal combustion is increased by the increasing of the compression ratio, in turn increasing the expansion ratio, in order to improve engine operating efficiency. As a result, this method can further enhance an engine operating efficiency in an engine operation range of high-load and low-speed with a higher expansion ratio and lower pump loss.

Further, a possibility of abnormal combustion in an operation range with higher engine speed than the above-described low engine speed range is decreased. In view of this fact, this method can include closing an intake valve earlier during a cylinder cycle as an engine speed is greater (e.g., as engine speed increases), which restrains blowing back of air and, in turn, increases cylinder air charge amount and increases engine output due to increased combustion of fuel in response to the increased air amount. As a result, according to this method, an engine operation efficiency and engine output are increased in a broad range of engine operation.

In an example embodiment, this method further comprises closing said intake valve earlier during a cylinder cycle as the engine speed increases when the engine speed is a first predetermined speed or less and said desired amount of air to be inducted into said cylinder is at a maximum. The method may further comprise closing said intake valve later during a cylinder cycle as the engine speed increases when the engine speed is greater than said first predetermined speed and the desired amount of air to be inducted into said cylinder is at a maximum at the given engine speed.

According to this method, in response to a decreased possibility of abnormal combustion occurrence as engine speed increases, an intake valve is closed earlier as engine speed increases when an engine speed is equal to a first predetermined speed or less, which limits blowing back of air and increases cylinder air charge amount.

Meanwhile, when the engine speed is greater than said first predetermined speed, in response to an increasing inertia of inducted air flow combined with an increasing engine speed, and retarding of an intake valve closing timing when a desired amount of air to be inducted into said cylinder is at a maximum, the intake valve is closed later as engine speed increases. This will increase cylinder air charge amount, and in turn engine output is increased by combusting an increased amount of fuel in response to increased air amount. As a result, according to this method, engine operation efficiency and engine output are increased in a broad range of engine operation.

In another example embodiment, this method further comprises a step of closing the intake valve at a substantially fixed timing when the desired amount of air to be inducted into the cylinder is a predefined air amount or less.

And in this case, this method may further comprise a step of increasing a pressure in the air intake passage as the desired amount of air to be inducted into the cylinder increases when the desired amount of air to be inducted into the cylinder is the predefined air amount or less. This can ensure that an air amount in a cylinder is the desired amount.

In another example embodiment, this method further comprises a step of opening the intake valve earlier during a cylinder cycle and closing an exhaust valve of said cylinder later during the cylinder cycle as the engine speed increases when the engine speed is a second predetermined speed or less and the desired amount of air to be inducted into the cylinder is at a maximum at the given engine speed.

In this case, an exhaust valve may close before an intake valve opens during the cylinder cycle if an engine speed is the second predetermined speed or less and when the desired amount of air inducted into said cylinder is maximum at the given engine speed.

By shortening an overlap period where both of an intake valve and an exhaust valve are opened as an engine speed is smaller, or by lengthening a negative overlap period where both of an intake valve and an exhaust valve are closed as an engine speed is smaller, an in-cylinder pressure at a timing of an intake valve opening is increased, which will increase an intake air flow rate and, thus, in-cylinder fluidity, thereby inhibiting abnormal combustion.

Meanwhile, because a possibility of abnormal combustion is decreasing as an engine speed is greater, by lengthening an overlap period as an engine speed is greater, scavenging action is enhanced, which results in higher concentration of oxygen in intake air, thereby increasing output torque.

A second aspect of the present description includes a system comprising: an internal combustion engine having a cylinder accommodating a piston which reciprocates therein, and defining a combustion chamber, an air intake passage through which air is inducted into said cylinder, and an intake valve capable of shutting off air flowing into said cylinder from said air intake passage; an intake valve driving mechanism which is configured to cyclically open and close said intake valve; and a controller configured to control said intake valve driving mechanism to: close said intake valve later during a cylinder cycle than a timing with which an amount of air inducted into said cylinder from said air intake passage is maximized, and earlier during the cylinder cycle as the desired amount of air inducted into said cylinder is greater at a given engine speed; and close said intake valve earlier during a cylinder cycle as the engine speed is greater and the desired amount of air inducted into said cylinder is maximum at the given engine speed.

This system also overcomes at least some of the disadvantages of the references described above.

According to this system, in a high-load and low-speed range, an intake valve is closed later during a cylinder cycle than a timing with which an amount of air inducted into said cylinder from said air intake passage is maximized, which results in an intake valve being closed at a timing with which a substantial amount of air is blowing back to the intake passage from a cylinder. This makes it possible to avoid occurrence of an abnormal combustion, by decreasing air amount inducted into a cylinder without increasing pump loss due to throttle valve closing, within an engine operating range of high-load and low-speed where an abnormal combustion easily occurs. Further, this makes it possible to avoid occurrence of an abnormal combustion even when a possibility of abnormal combustion is increased by the increasing of a combustion ratio, in turn increasing an expansion ratio, in order to improving engine operating efficiency. As a result, this system can further enhance an engine operating efficiency in an engine operation range of high-load and low-speed with a higher expansion ratio and lower pump loss.

Further, a possibility of abnormal combustion in an operation range with higher engine speed than the above-described low engine-speed range is decreased. This system closes an intake valve earlier during a cylinder cycle as an engine speed is greater, which restrains blowing back of air and in turn, increases cylinder air charge amount and increases engine output due to increased fuel combustion in response to increased air amount. As a result, according to this system, an engine operation efficiency and engine output are increased in a broader range of engine operation.

In an example embodiment, an internal combustion engine in this system has a geometric compression ratio of 13:1 or greater.

Typically, in an internal combustion engine with a higher geometric compression ratio, in-cylinder temperature can be easily increased by compressing action and thus, there is a high possibility of abnormal combustion. Therefore, it is very effective to adopt this system for such an internal combustion engine with a higher geometric compression ratio.

In an example, an intake valve driving mechanism comprises a camshaft which is driven by a crankshaft that is coupled to said piston and drives an intake valve, and a phase changing mechanism which changes an angular phase of a camshaft relative to an angular phase of said crankshaft, and wherein a controller varies the closing timing of said intake valve by actuating said phase changing mechanism.

As described above, according to the present description, an engine operation efficiency and engine output are increased in a broader range of engine operation.

The above advantages and other advantages, and features of the present description will be readily apparent from the following Detailed Description when taken alone or in connection with the accompanying drawings.

BRIEF DESCRIPTION OF THE DRAWINGS

FIGS. 5A-5D are diagrams showing valve timings of the intake valve where FIG. 5A shows the valve timing in a low-load range, FIG. 5B shows the valve timing in a high-load and low-speed range, FIG. 5C shows the valve timing in a high-load and middle-speed range, and FIG. 5D shows the valve timing in a high-load and high-speed range.

FIGS. 13A-13D are diagrams showing valve timings where FIG. 13A shows the valve timing in a low-load range, FIG. 13B shows the valve timing in a low-speed range, FIG. 13C shows the valve timing in a high-load and middle-speed range, and FIG. 13D shows the valve timing in a high-load and high-speed range.

FIG. 16A shows the valve timing in a low-load range, FIG. 16B shows the valve timing in a low-speed range, FIG. 16C shows the valve timing in a high-load and middle-speed range, and FIG. 16D shows the valve timing in a high-load and high-speed range.

DETAILED DESCRIPTION

A preferred embodiment of the invention is described with reference to the drawings.

Figure 1:
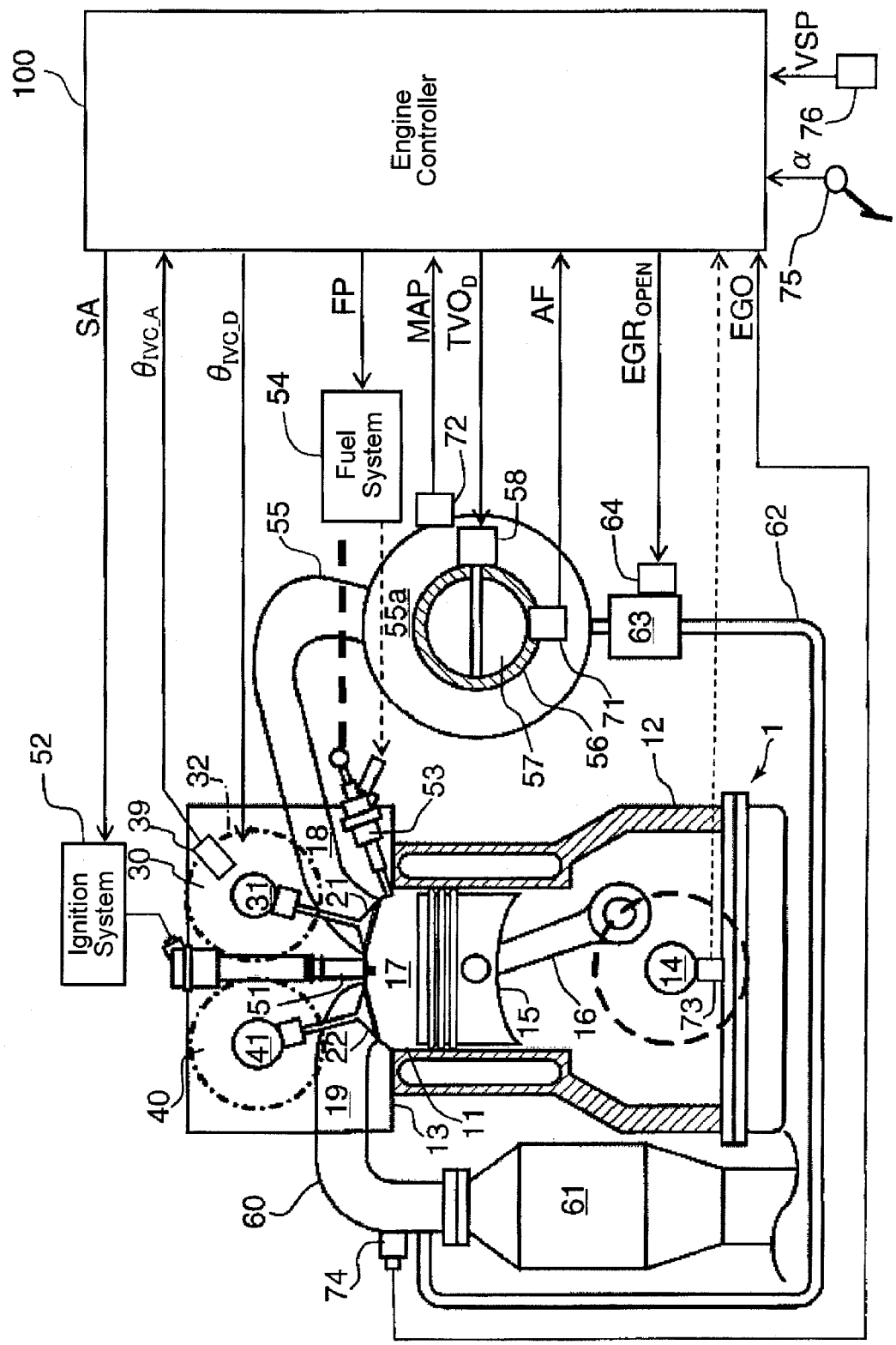
FIG. 1 is a schematic view of an overall structure of an engine system to which an intake valve control method of an internal combustion engine according to the present invention is applied.

FIG. 1 schematically shows an overall structure of an engine system to which the invention is applied. The engine system includes an engine main body (internal combustion engine) 1 and an engine controller (control module) 100, which is configured to control various actuators associated with the engine main body 1.

The engine main body 1 is a four-cycle spark-ignited internal combustion engine installed in a vehicle, such as an automobile. An output shaft of the engine main body 1 is coupled to a drive wheel via a transmission in order to drive the vehicle. The engine main body 1 includes a cylinder block 12 and a cylinder head 13 placed thereon. Inside the cylinder block 12 and the cylinder head 13, a plurality of cylinders 11 are formed. The number of cylinders 11 is not limited; however, four cylinders 11 are formed in this embodiment, as one example. Further, in the cylinder block 11, a crankshaft 14 is supported rotatably by a journal, a bearing and the like.

To each of the cylinders 11, a piston 15 is slideably inserted and fitted, over which a combustion chamber 17 is laid out.

In this embodiment, a geometric compression ratio of the engine main body 1 is set to approximately 14, which is the ratio of the volume of the combustion chamber 17 when the piston 15 is positioned at the bottom dead center to the volume of the combustion chamber 17 when the piston 15 is positioned at the top dead center. Of course, the value of the geometric compression ratio is not limited to 14. For example, it may be preferable that the geometric compression ratio is higher from the point of view of improving engine efficiency. However, as the geometric compression ratio is set higher, an in-cylinder temperature can become too high in the compression stroke, thus increasing the possibility of an auto-ignition occurring at an unexpected timing. Thus, the geometric compression ratio of the engine main body 1 may be, preferably, 13 or more and 16 or less.

The cylinder head 13 is formed with two intake ports and two exhaust ports communicating with the respective one of combustion chambers. In FIG. 1, one intake port 18 and one exhaust port 19 are shown, though two intake ports and two exhaust ports per cylinder are included in this embodiment, as described above. Further, the cylinder head 13 is provided with intake valves 21 blocking the respective intake ports 18 from the combustion chamber 17 and exhaust valves 22 blocking the respective exhaust ports 19 from the combustion chamber 17. The intake valves 21 are driven by an intake valve driving mechanism 30, described later, to open and close the respective intake ports 18 at a predetermined timing. On the other hand, the exhaust valves 22 are driven by an exhaust valve driving mechanism 40 to open and close the respective exhaust ports 19.

The intake valve driving mechanism 30 and the exhaust valve driving mechanism 40 have an intake camshaft 31 and an exhaust camshaft 41, respectively. The intake camshaft 31 and the exhaust camshaft 41 are coupled to the crankshaft 14 via a power transmission mechanism such as a known chain-sprocket mechanism. The power transmission mechanism is configured such that the camshafts 31 and 41 rotate one time while the crankshaft 14 rotates two times.

Further, in the intake valve driving mechanism 30, there is provided an intake camshaft phase changing mechanism 32 between the power transmission mechanism and the intake camshaft 31. The intake camshaft phase changing mechanism 32 is set to change the valve timing of the intake valve 21, in which a phase difference between the crankshaft 14 and the intake camshaft 31 is changed by changing the phase difference between the driven shaft, which is arranged concentrically with the intake camshaft 31 and is directly driven by the crankshaft 14, and the intake camshaft 31.

The intake camshaft phase changing mechanism 32 includes, for example, a hydraulic pressure mechanism where a plurality of liquid chambers are arranged in a circumferential direction between the driven shaft and the intake camshaft 31 and a pressure difference is given between the liquid chambers to change the phase difference, and an electromagnetic mechanism where an electromagnet is provided between the driven shaft and the intake camshaft 31, and the electromagnet is applied with current to change the phase difference. The intake camshaft phase changing mechanism 32 changes the phase difference based on the valve timing of the intake valve 21 calculated by the engine controller 100, described later.

In this embodiment, the intake camshaft phase changing mechanism 32 changes the valve opening timing IVO and valve closing timing IVC of the intake valve 21 by changing the phase difference while the opening timing and the lift amount (i.e., a valve profile of the intake valve 21) is kept constant. A phase angle of the intake camshaft 31 is detected by a cam phase sensor 39, and a signal $\theta_{IVC\_A}$ thereof is transmitted to the engine controller 100.

The intake port 18 communicates with a surge tank 55a via an intake manifold 55. The air intake passage upstream of the surge tank 55a is provided with the throttle body (throttle valve actuator) 56. A throttle valve 57 (pressure control module) is pivotally provided inside the throttle body 56 for adjusting the intake flow volume flowing from the external to the surge tank 55a. The throttle valve 57 can change the opening area of the air intake passage (i.e., the flow passage area) to change the intake flow volume, and the pressure in the air intake passage downstream of the throttle valve 57. The throttle valve 57 is actuated by a throttle valve actuator 58. The throttle valve actuator 58 actuates the throttle valve 57 such that the opening TVO of the throttle valve 57 is to be a target throttle valve opening $TVO_D$ calculated in the engine controller 100, described later in detail. Here, the air intake passage in the claims may include all of the intake port 18, the intake manifold 55 and the surge tank 55a downstream of the throttle valve 57. In this embodiment, an amount of air to be inducted into the cylinder 11, that is, the air charge amount CE inside the cylinder 11 is controlled to have an adequate value by adjusting the opening of the throttle valve 57 and the closing timing of the intake valve 21.

The exhaust port 19 communicates with an exhaust pipe via an exhaust manifold 60. In the exhaust pipe, an exhaust gas treatment system is arranged. A specific constitution of the exhaust gas treatment system is not limited to, but may include those having a catalytic converter 61 of a three-way catalyst, a lean NOx catalyst, an oxidation catalyst and the like.

The intake manifold 55 and the exhaust manifold 60 communicate with each other via an EGR pipe 62, constituted such that a part of the exhaust gas is circulated to an intake side. Provided in the EGR pipe 62 is an EGR valve 63 for adjusting the flow volume of EGR gas circulating to the intake side through the EGR pipe 62. The EGR valve 63 is actuated by an EGR valve actuator 64. The EGR valve actuator 64 actuates the EGR valve 63 such that the opening of the EGR valve 63 becomes an EGR opening EGRopen calculated by the engine controller 100, described later in detail. This makes it possible to adjust the flow volume of the EGR gas to an adequate value.

The cylinder head 13 has spark plugs 51 attached thereto such that a tip of each spark plug faces the combustion chamber 17. The spark plug 51 generates a spark in the combustion chamber 17 when supplied with current by an ignition system 52, based on an ignition timing SA calculated by the engine controller 100, described later in detail.

Further, the cylinder head 13 has fuel injection valves 53 attached thereto for injecting fuel directly into the respective combustion chambers 17 such that a tip of each of the fuel injection valves faces the combustion chamber 17. In more detail, the fuel injection valve 53 is arranged such that the tip thereof is positioned below the two intake ports 18 in a vertical direction, and midway between the two intake ports 18 in a horizontal direction. The fuel injection valve 53 injects a predetermined amount of fuel into the combustion chamber 17 when a solenoid coupled to the fuel injection valve 53 is supplied with current by a fuel system 54, based on a fuel injection amount FP calculated by the engine controller 100, described later, for a predetermined period of time.

The engine controller 100 is a controller having a known microcomputer as a base and includes a CPU for executing a program, a memory such as RAM and ROM for storing a program and data, and an I/O bus for inputting and outputting various signals.

The engine controller 100 receives inputs via the I/O bus, with various information such as an intake air amount AF detected by an air flow meter 71, an air pressure MAP inside the intake manifold 55 detected by an intake pressure sensor 72, a crank angle pulse signal detected by a crank angle sensor 73, an oxygen concentration EGO of the exhaust gas detected by an oxygen concentration sensor 74, an amount a of depression of a gas-pedal by a driver of the automobile detected by a gas-pedal opening sensor 75, and a vehicle speed VSP detected by a vehicle speed sensor 76. Then, the engine controller 100 calculates instruction values for various actuators such that the air charge amount, ignition timing and the like in the cylinder 11 may be an appropriate value according to the operating conditions based on the input information. For example, the instruction values such as a throttle valve opening TVO, the fuel injection amount FP, the ignition timing SA, a target value of the intake valve timing $\theta_{VCT\_D}$ and the EGR opening $EGR_{open}$ are calculated and output to the throttle valve actuator 58, the fuel system 54, the ignition system 52, the intake camshaft phase changing mechanism 32, the EGR valve actuator 64 and the like.

Figure 2:
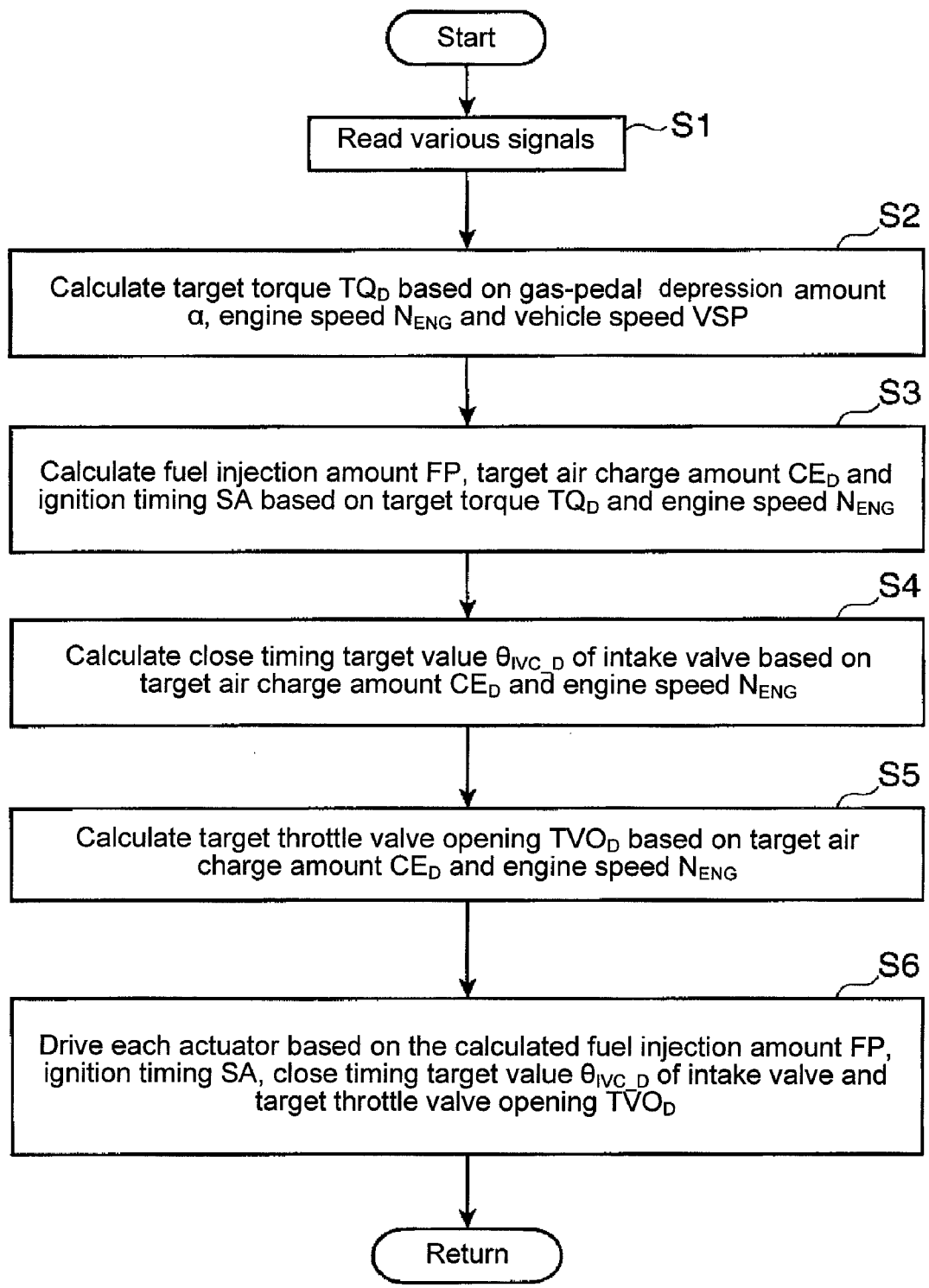
FIG. 2 is a flowchart for explaining a control procedure of the control method according to the invention.

A specific arithmetic procedure in the engine controller 100 is described by use of the flowchart of FIG. 2.

First, various signals such as the amount α of the gas-pedal depression are read (step S1).

Next, a target torque $TQ_D$ is calculated based on the gas-pedal depression amount α, the engine speed $N_{ENG}$ of the engine main body 1 (calculated from the crank angle pulse signal) and the vehicle speed VSP (step S2). The fuel injection amount FP, the target air charge amount CED (a target value of the air charge amount CE in the cylinder 11) and the ignition timing SA are calculated based on the calculated target torque $TQ_D$ and engine speed $N_{ENG}$ (step S3).

Then, a target value $\theta_{IVC\_D}$ of the closing timing IVC of the intake valve 21 is calculated based on the target air charge amount $CE_D$ and the engine speed $N_{ENG}$ calculated in step S3 (step S4). Further, a target throttle valve opening $TVO_D$ as a target value of the opening TVO of the throttle valve 57 is calculated based on the calculated target air charge amount $CE_D$ and the engine speed $N_{ENG}$ (step S5). The calculating method of the target value $\theta_{IVC\_D}$ of the closing timing IVC of the intake valve 21 and the target throttle valve opening $TVO_D$ is described in detail later.

After that, the respective actuators are driven based on the fuel injection amount FP, the ignition timing SA, the target intake valve closing timing value $\theta_{IVC\_D}$, and the target throttle valve opening $TVO_D$ which are calculated such that these target values are satisfied (step S6). Specifically, the signal $\theta_{IVC\_D}$ is outputted to the intake camshaft phase changing mechanism 32. Then, the intake camshaft phase changing mechanism 32 operates such that a phase of the intake camshaft 31 relative to the crankshaft 14 has a value corresponding to $\theta_{IVC\_D}$. The signal $TVO_D$ is outputted to the throttle valve actuator 58. Then, the throttle valve actuator 58 operates such that the opening TVO of the throttle valve 57 has a value corresponding to $TVO_D$. The signal FP is outputted to the fuel system 54. The amount of fuel corresponding to FP per one cylinder cycle is injected from the fuel injection valve 53. Then, the signal SA is outputted to the ignition system 52. The spark plug 51 is ignited and an air-fuel mixture is ignited in the combustion chamber 17 at a timing corresponding to SA in the cylinder cycle. This causes the air-fuel mixture, including the required amount of air and fuel, to be ignited and burned at an appropriate timing such that the target torque, determined mainly from the gas-pedal depression amount α is generated from the engine main body 1.

Next, the description of a method is provided for calculating the target value $\theta_{IVC\_D}$ of the closing timing IVC of the intake valve 21 and the target throttle valve opening $TVO_D$. That is, a specific method is provided for controlling the intake valve 21 and the throttle valve 57. In the following description, values representing the time and period of the open and close timings of the intake valve 21 and the like are found from the crank angle. It will be appreciated that after bottom dead center is referred to herein as ABDC.

In a range where the engine load is small and the target air charge amount $CE_D$ is lower than a reference air charge amount $CE_{D\_base}$ (range A in FIGS. 3 and 4), the closing timing IVC of the intake valve 21 is controlled to be kept constant, independent of the engine speed $N_{ENG}$, and the throttle valve opening TVO is controlled to vary in response to the target air charge amount $CE_D$. Specifically, the closing timing IVC of the intake valve 21 is controlled to be a value of approximately 100° CA ABDC (100° crank angle after bottom dead center), sufficiently retarded from BDC as shown in FIG. 5A, and the throttle valve opening TVO is controlled to be greater as the target air charge amount CED increases, that is, such that the opening area of the air intake passage greatly increases as shown in FIG. 4. Here, for example, the reference air charge amount $CE_{D\_base}$ has a value of approximately half the maximum air charge amount of the engine main body 1.

Figure 6:
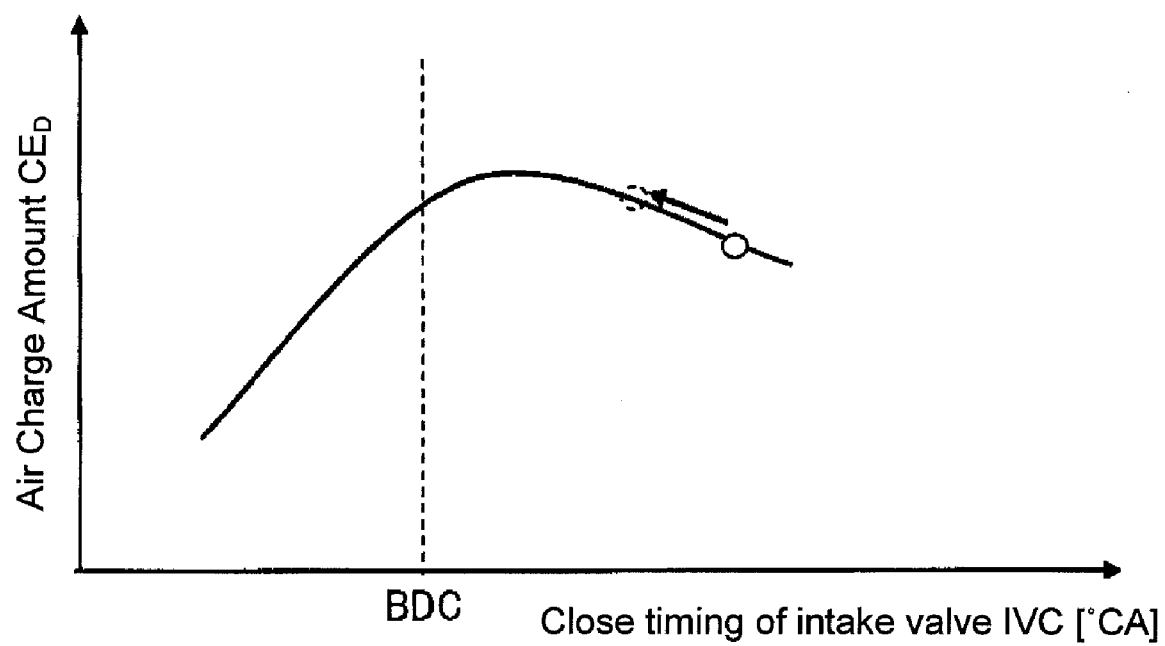
FIG. 6 is a graph showing a relationship between the closing timing of the intake valve and the air charge amount.

As shown in FIG. 6, the air charge amount CE in the cylinder 11 is maximized when the closing timing IVC of the intake valve 21 is around BDC in a low-speed range, and the air charge amount CE decreases as the closing timing IVC is retarded from that (e.g., rightward in FIG. 6) because the air in the cylinder 11 is blowing back to an intake passage. Therefore, if the closing timing IVC of the intake valve 21 is controlled as described above so as to be approximately 100° CA ABDC where the closing timing IVC is retarded from the timing with which the air charge amount CE would be maximized, the air charge amount CE in the cylinder 11 can be restricted to a sufficiently small value.

Further, in a range where the engine load is high and the target air charge amount $CE_D$ is higher than the reference air charge amount $CE_{D\_base}$ (see range B in FIGS. 3 and 4), the throttle valve opening TVO is controlled to be kept constant for every engine speed $N_{ENG}$ independently of the target air charge amount $CE_D$, and the closing timing IVC of the intake valve 21 is controlled to vary in response to the target air charge amount $CE_D$. Specifically, the throttle valve opening TVO is controlled around a full opening. Then, the closing timing IVC of the intake valve 21 is controlled to be retarded from the timing with which the air charge amount CE would be maximized (see FIG. 6) and advanced as shown by an arrow in FIG. 6 as the target air charge amount $CE_D$ increases.

As described above, on a side retarded from the timing with which the air charge amount CE would be maximized, as the closing timing IVC of the intake valve 21 is further retarded, the air charge amount CE is decreased. Therefore, in the range B, controlling the closing timing IVC of the intake valve 21 to be advanced increases the air charge amount CE, and satisfies the target air charge amount $CE_D$. Particularly, in this embodiment, the throttle valve opening TVO is controlled around a full opening, and the throttle valve 57 then closes the opening area of the air intake passage to reduce pumping loss, improving engine operating efficiency.

In range A of this embodiment (see FIG. 4), the throttle valve opening TVO is controlled to be variable in response to the engine speed $N_{ENG}$ in all engine operation ranges. Specifically, the throttle valve opening is controlled to be progressively opened as the engine speed $N_{ENG}$ increases.

Figure 3:
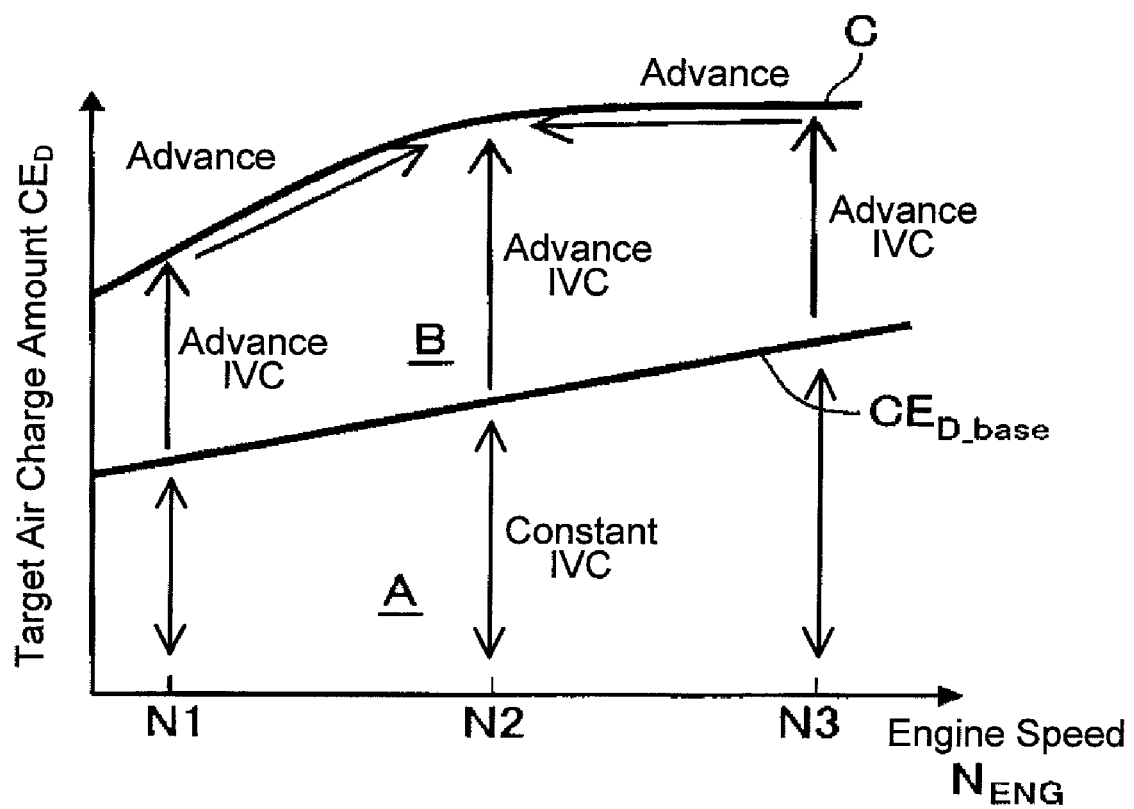
FIG. 3 is a graph showing a closing timing of an intake valve with respect to an engine speed and a target air charge amount.
Figure 4:
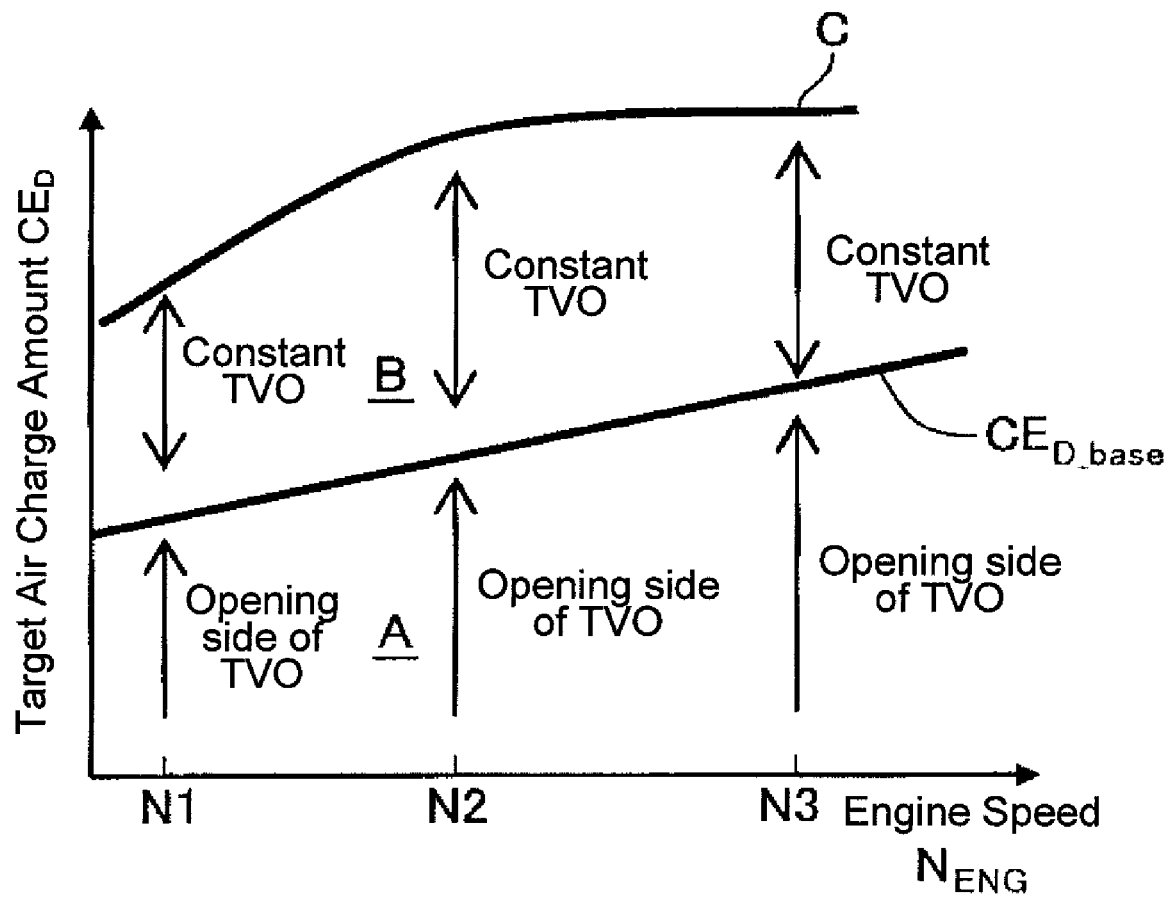
FIG. 4 is a graph showing an opening of a throttle valve with respect to an engine speed and a target air charge amount.

In addition, the closing timing IVC of the intake valve 21 is controlled to vary in response to the engine speed $N_{ENG}$ in the range B, and a full-load range of the engine (range C, where the target air charge amount $CE_D$ in FIGS. 3 and 4 is maximized), that is, in a range larger than the reference target air charge amount $CE_{D\_BASE}$. Specifically, the closing timing is controlled to be advanced as the engine speed NENG increases in a range where the engine speed $N_{ENG}$ is the reference engine speed or less (e.g., between N1 and N2 of FIG. 3), and retarded as the engine speed increases in a range B where the engine speed $N_{ENG}$ is the reference engine speed N2 or more (e.g., between N2 and N3 of FIG. 3). Details of control of the closing timing IVC of the intake valve 21 in the ranges B and C is described hereinafter.

First, when the engine speed $N_{ENG}$ is as small as N1, and the target air charge amount $CE_D$ is the maximum (e.g., high load condition), the closing timing IVC of the intake valve 21 is controlled to be sufficiently retarded from BDC, such that the closing timing is retarded from the timing with which the air charge amount CE is maximized. This may be, for example, around 80° CA ABDC as shown in FIG. 5B and by a point P1 in FIG. 7.

Here, air fluidity in the cylinder 11 is small in the low-speed range; thus, there is a high possibility of occurrence of auto-ignition in the cylinder 11 due to the increase of the temperature by a compressing action. Therefore, it may be preferable, in this range, to restrict the air charge amount CE in the cylinder 11 to be small and prevent the temperature from increasing as well. As described above, the air charge amount CE is restricted to be small by controlling the closing timing IVC of the intake valve 21 to be sufficiently retarded from the timing with which the air charge amount CE is maximized. Thus, the air charge amount CE in the cylinder 11 is reduced, and the temperature in the cylinder 11 by a compression action of the charged air is suppressed, preventing the occurrence of auto-ignition. Particularly, in this engine main body 1 where the geometric compression ratio can be set as high as 14 for example, auto-ignition can easily occur; thus, the above-described control efficiently reduces such a negative effect.

Next, in a range from the engine speed N1 to the reference engine speed N2 (>N1), the closing timing IVC of the intake valve 21 is controlled to be retarded from the timing with which the air charge amount CE would be maximized, and advanced as the engine speed $N_{ENG}$ increases. For example, when the target air charge amount $CE_D$ is the maximum at the engine speed N2, the closing timing IVC of the intake valve 21 is controlled to be advanced to around 30° CA ABDC where the air charge amount CE is maximized, as shown in FIG. 5C and by a point P2 in FIG. 7. When the engine speed $N_{ENG}$ increases and the air fluidity increases, thereby decreasing the possibility of abnormal combustion occurrence (e.g., at engine speed N2), the air charge amount CE in the cylinder 11 can be increased. Therefore, in this range, as the engine speed $N_{ENG}$ increases to N2, the closing timing IVC of the intake valve 21 is controlled to be advanced to increase the air charge amount CE in the cylinder 11 and combust an increased amount of fuel, and in turn, engine output and engine operating efficiency are increased.

Figure 7:
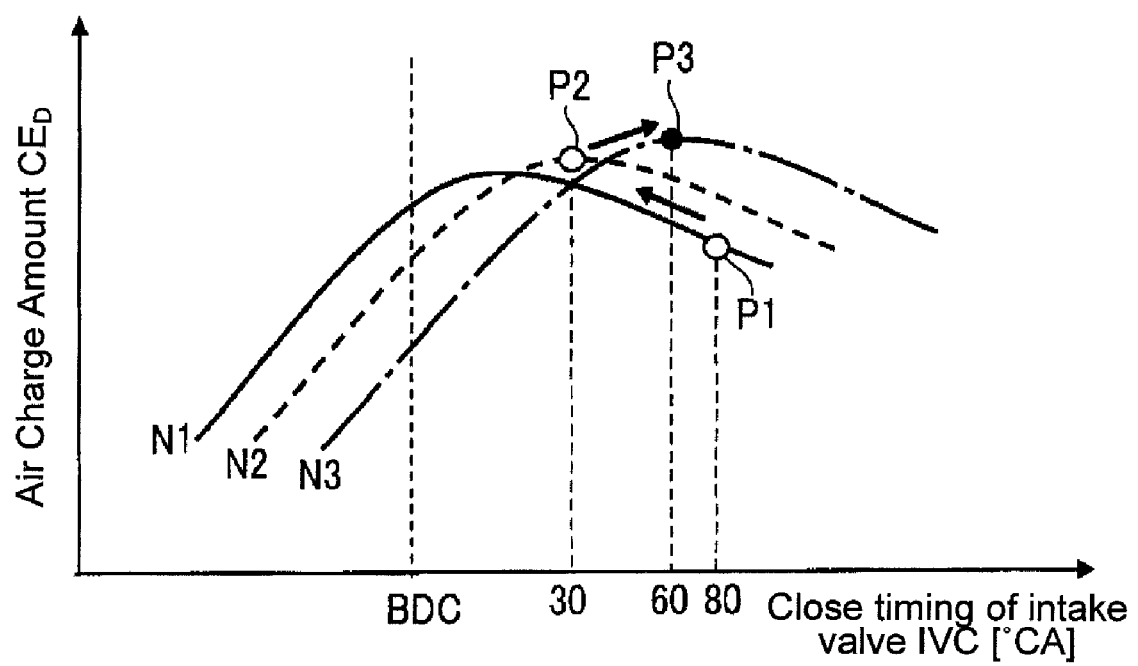
FIG. 7 is a graph showing a relationship between the closing timing of the intake valve and the air charge amount at each engine speed.

Here, as shown in FIG. 7, as the engine speed $N_{ENG}$ increases, the intake air inertia increases; thus, the timing with which the air charge amount CE is maximized is transitioned to be retarded (e.g., translated from the peak of the N1 curve to the peak P2 of the N2 curve of FIG. 7). Further, as described above, on the retarded side during the cylinder cycle from the timing with which the air charge amount CE would be maximized, as the closing timing IVC of the intake valve 21 is advanced, the amount of air blowing back to an intake passage decreases and the air charge amount CE increases. Therefore, as described above, when the closing timing IVC of the intake valve 21 is advanced as the engine speed increases, the air charge amount CE in the cylinder 11 may increase sufficiently with the effect of the amount of air blowing back being reduced and the effect of increased inertia. Particularly, if the closing timing IVC of the intake valve 21 is made advanced, to around the timing with which the air charge amount CE is maximized (e.g., to P2), the air charge efficiency increases.

The engine speed N1 has a value of, for example, approximately 1000 rpm, and the reference engine speed N2 has a value of, for example, approximately 2500 rpm. However, it may be appreciated that adequate values for N1 and N2 can be found, by experiment, in advance.

Finally, in a range from the engine speed N2 to the engine speed N3 (>N2), the closing timing IVC of the intake valve 21 is controlled to be retarded as the engine speed $N_{ENG}$ increases. When the target air charge amount $CE_D$ is the maximum at the engine speed N3, the closing timing is controlled to be retarded to around 60° CA ABDC where the air charge amount CE would be maximized, as shown in FIG. 5D and by a point P3 in FIG. 7. The engine speed N3 has a value of, for example, approximately 7000 rpm.

In this embodiment, when the target air charge amount $CE_D$ is the maximum and the engine speed $N_{ENG}$ is N2, the closing timing IVC of the intake valve 21 is controlled to be around a timing with which the air charge amount CE would be maximized. Then, as described above, the timing with which the air charge amount CE would be maximized is transitioned to be retarded (e.g., from P2 to P3 in FIG. 7) due to the increased intake air inertia as the engine speed $N_{ENG}$ increases. For this reason, in the high engine speed range from the engine speed N2 to the engine speed N3, since the closing timing IVC of the intake valve 21 is controlled to be retarded as the engine speed $N_{ENG}$ increases, the air charge amount CE is kept approximately constant at the maximum value.

As described above, the possibility of abnormal combustion occurrence decreases as the engine speed $N_{ENG}$ increases; thus, there is little possibility of abnormal combustion occurrence in the range where the engine speed exceeds the engine speed N2. Therefore, in a range where the engine speed $N_{ENG}$ is N2 or more and the target air charge amount $CE_D$ is the maximum, since the closing timing IVC of the intake valve 21 is controlled to be retarded as the engine speed $N_{ENG}$ increases, and the air charge amount is kept at the maximum value, the maximum amount of fuel can be combusted, and the engine output and the engine operating efficiency are kept as high as possible.

With the control described above, in this engine main body 1, the air charge amount CE in the cylinder 11 is sufficiently restricted in the low-speed range to make sure auto-ignition is prevented, and the air charge amount CE in the cylinder 11 is retained sufficiently high in the middle and high engine speed ranges to maintain engine output.

Here, in the range from the engine speed N2 to N3, the closing timing IVC of the intake valve 21 may be controlled to be retarded from the timing with which the air charge amount CE is maximized. Alternatively, the closing timing IVC may be controlled only to be advanced for all engine speeds as the speed increases to high engine speed, without controlling the closing timing IVC of the intake valve 21 to be retarded in the range from the engine speed N2 to N3.

Further, the closing timing IVC of the intake valve 21 may be varied in the low-load range A. However, if the closing timing IVC of the intake valve 21 is kept constant in the low-load range A, a controlled range of the valve timing IVC of the intake valve 21 can be restricted to be small. Therefore, the negative effects of valve timing variation can be prevented. For example, such a case where the opening timing IVO of the intake valve 21 varies corresponding to the variation of the closing timing IVC can be prevented, thereby to keep the valve overlap period where both the intake valve 21 and the exhaust valve 22 are open, to be adequate. This is particularly efficient in a case where the opening period of the intake valve 21 is set constant by the intake valve driving mechanism, as in this embodiment.

Additionally, the constitutions of various actuators are not limited to those described above.

Further, specific values of the closing timing IVC of the intake valve 21, the reference air charge amount, the engine speed N1, N2 and N3, and the like are not limited to those described above. Next, a second embodiment of the invention is described with reference to the drawings.

In the second embodiment, in addition to the control of the closing timing of the intake valve 21 in the above described embodiment, the opening timing of the intake valve 21 and the closing timing of the exhaust valve 22 are controlled. An outline of the second embodiment is such that when the target air charge amount $CE_D$ is the maximum and the engine speed $N_{ENG}$ is N5 or less, the opening timing of the intake valve 21 is controlled to be advanced, and the closing timing of the exhaust valve 22 in the cylinder 11 is controlled to be retarded as the engine speed $N_{ENG}$ increases. Further, when the engine speed $N_{ENG}$ is smaller than a predetermined speed N4 or less which is smaller than N5, the exhaust valve 22 is controlled to be closed before the intake valve 21 opens.

By shortening the overlap period where both the intake valve and the exhaust valve are opened as the engine speed is smaller, or by lengthening a negative overlap period where both the intake valve and the exhaust valve are closed as the engine speed is smaller, the in-cylinder pressure at a timing of an intake valve opening is reduced, which will increase the intake air flow rate and in-cylinder fluidity, thereby suppressing abnormal combustion. Meanwhile, because the possibility of abnormal combustion is decreasing as the engine speed is greater, by lengthening the overlap period as the engine speed is greater, scavenging action is enhanced which results in higher concentration of oxygen in the air inducted into the cylinder, thereby increasing output torque.

Next, the second embodiment is specifically described with reference to the drawings, which, similarly to the invention, can be applied to the engine system, an entire constitution overview of which is shown in FIG. 1. Thus the description of the entire constitution of the engine system is omitted because of the explanation of FIG. 1 described above. Further, control of the closing timing of the intake valve 21 is the same as that in the above described embodiment, the explanation of which is omitted. Here, control of the opening timing of the intake valve 21 and the closing timing of the exhaust valve 22 is described in detail.

Figure 8:
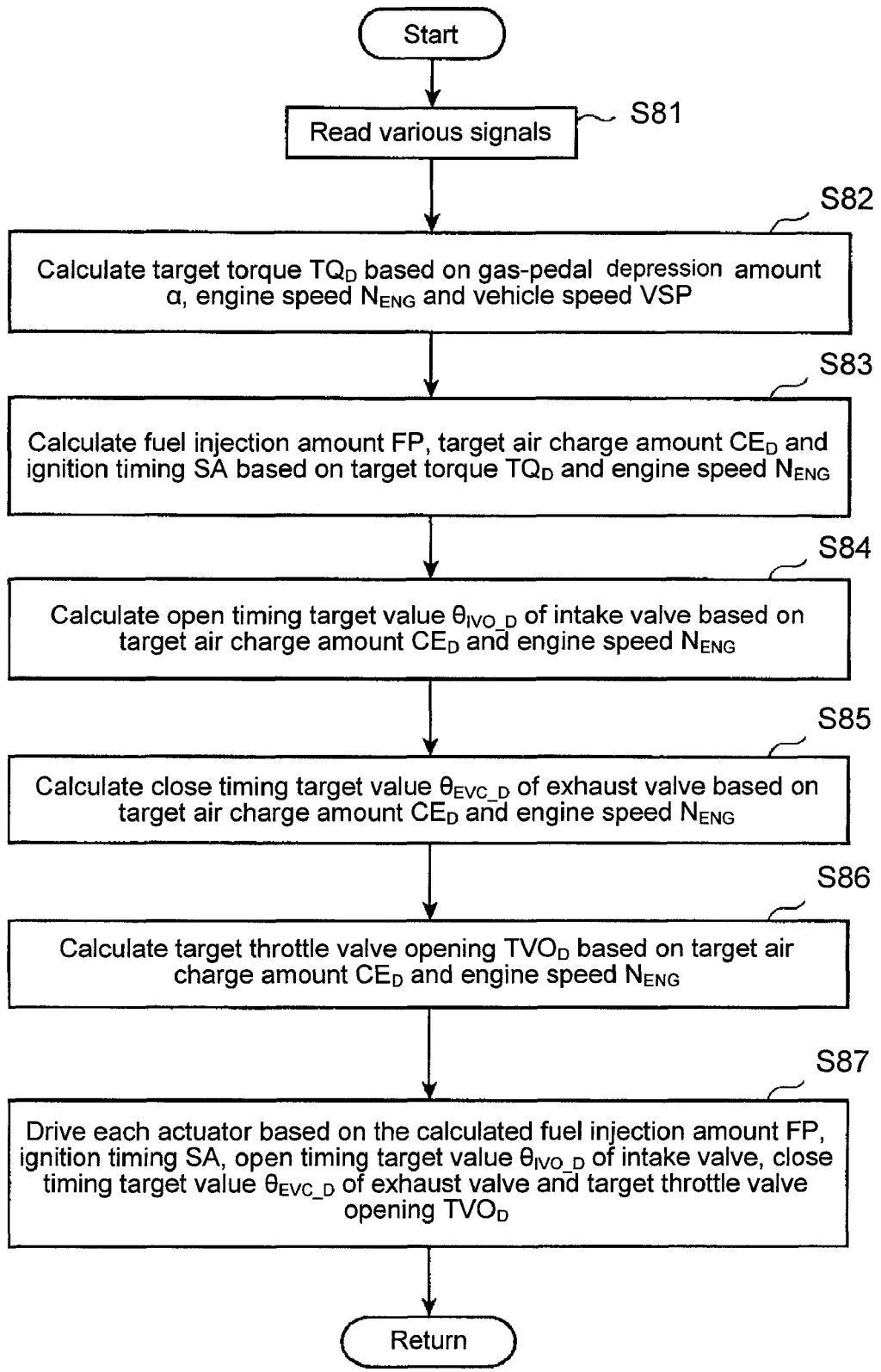
FIG. 8 is a flowchart for explaining another control procedure of the control method according to the invention in accordance with a second embodiment of the present description.

First, a specific control arithmetic procedure relating to the opening timing of the intake valve 21 and the closing timing of the exhaust valve 22 in the engine controller 100 is described using a flowchart in FIG. 8.

First, various signals such as the gas-pedal depression amount a are read (step S81).

Next, a target torque $TQ_D$ is calculated based on the gas-pedal depression amount α, the engine speed NENG of the engine main body 1 (calculated from the crank angle pulse signal) and the vehicle speed VSP (step S82). The fuel injection amount FP, the target air charge amount (the target value of the air charge amount CE in the cylinder 11) $CE_D$ and the ignition timing SA are calculated based on the calculated target torque $TQ_D$ and the engine speed $N_{ENG}$ (step S83).

Then, the target value $\theta_{IVO\_D}$ of the opening timing IVO of the intake valve 21 is calculated based on the target air charge amount $CE_D$ (calculated in step S83) and the engine speed $N_{ENG}$ (step S84). Further, the target value $\theta_{EVC\_D}$ of the closing timing EVC of the exhaust valve 22 is calculated based on the calculated target air charge amount CED and the engine speed $N_{ENG}$ (step S85). Additionally, the target throttle valve opening $TVO_D$ as a target value of the opening TVO of the throttle valve 57 is calculated based on the calculated target air charge amount CED and the engine speed $N_{ENG}$ (step S86). Details of methods for calculating the target value $\theta_{IVO\_D}$ of the opening timing IVO of the intake valve 21, the target value $\theta EVC\_D$ of the closing timing EVC of the exhaust valve 22, and the target throttle valve opening $TVO_D$ are described later.

Thereafter, based on the fuel injection amount FP, the ignition timing SA, the target value $\theta_{IVO\_D}$ of the opening timing IVO of the intake valve 21, the target value $\theta_{EVC\_D}$ of the closing timing EVC of the exhaust valve 22, and the target value $TVO_D$ of the opening TVO of the throttle valve 57 which are calculated, the respective actuators are driven such that these target values are satisfied (step S87). Specifically, the signal $\theta_{IVO\_D}$ is outputted to the intake camshaft phase changing mechanism 32. Then, this intake camshaft phase changing mechanism 32 operates such that a phase of the intake camshaft 31 relative to the crankshaft 14 has a value corresponding to $\theta_{IVO\_D}$. The signal $\theta_{EVC\_D}$ is outputted to the exhaust camshaft phase changing mechanism 42. Then, this exhaust camshaft phase changing mechanism 42 operates such that a phase of the exhaust camshaft 41 relative to the crankshaft 14 has a value corresponding to $\theta_{EVC\_D}$. The signal $TVO_D$ is outputted to the throttle valve actuator 58. Then, the throttle valve actuator 58 operates such that the opening TVO of the throttle valve 57 has a value corresponding to $TVO_D$. The signal FP is outputted to the fuel system 54. The amount of fuel corresponding to FP per one cylinder cycle is injected from the fuel injector 53. Then, the signal SA is outputted to the ignition system 52. At a timing corresponding to SA in a cylinder cycle, the spark plug 51 is ignited, and an air-fuel mixture in the combustion chamber 17 is ignited. With this, the air-fuel mixture including a required amount of air and fuel is ignited at an adequate period and combusted. Thus, the engine main body 1 generates a target torque, determined primarily from the gas-pedal depression amount $\alpha$.

The following is a description of a method for calculating the target opening timing value $\theta_{IVO\_D}$ of the opening timing IVO of the intake valve 21, the target closing timing value $\theta_{EVC\_D}$ of the closing timing EVC of the exhaust valve 22, and the target throttle valve opening $TVO_D$ as the target value of the throttle valve opening TVO. A specific method for controlling the intake valve 21, the exhaust valve 22 and the throttle valve 57 is provided. In the following description, values representing the opening duration, the opening and closing timings and the like of the intake valve 21 and the exhaust valve 22 are found from a crank angle, and before the top dead center is referred to as BTDC and after the top dead center is referred to as ATDC.

Figure 9:
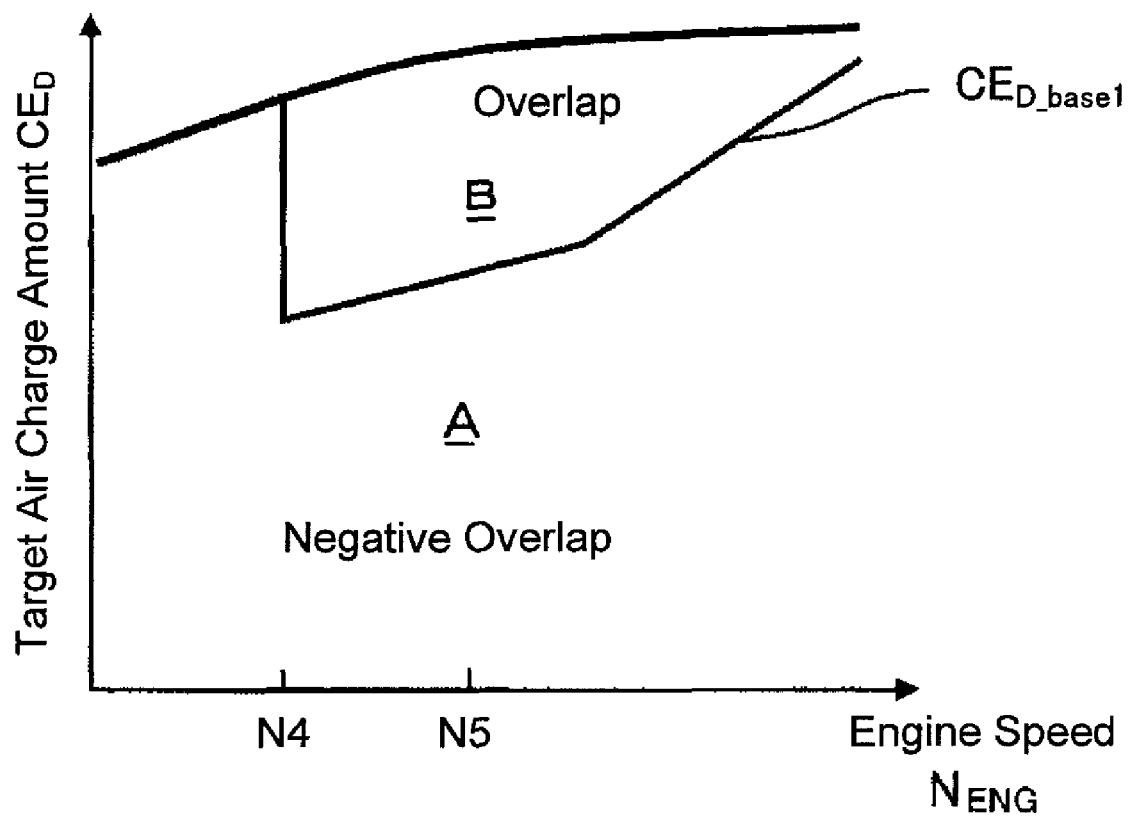
FIG. 9 is a graph showing control ranges of the intake valve and exhaust valve.

Referring now to FIG. 9, a range A includes the low-speed range where the engine speed $N_{ENG}$ is a fourth engine speed (fourth speed) N4 or lower, and the high-speed range where the engine speed is higher than the fourth engine speed N4 and the target air charge amount $CE_D$ is smaller than a first reference air charge amount $CE_{D\_base1}$. In this range A, a control is performed such that the exhaust valve 22 closes after the top dead center, and after this exhaust valve 22 closes, the intake valve 21 opens. In other words, in this range A as shown in FIGS. 13A and 13B, the closing timing EVC of the exhaust valve 22 is controlled to be after the top dead center and the opening timing IVO of the intake valve 21 is controlled to be retarded from the closing timing EVC of the exhaust valve 22, such that the opening periods of these intake valve 21 and exhaust valve 22 are controlled so as not to overlap. Hereinafter, a state where the valve opening periods do not overlap is referred to as a negative overlap state and a period from the closing timing EVC of the exhaust valve 22 to the opening timing IVO of the intake valve 21 in this negative overlap state is referred to as a negative overlap period.

In the negative overlap state, the cylinder 11 is substantially hermetically closed. In this substantially hermetically closed state, when a piston 15 descends, a pressure in the cylinder 11 decreases as the volume in the cylinder 11 increases, and at an end point of time of the negative overlap, that is, an opening timing of the intake valve 21, the pressure in the cylinder 11 sufficiently decreases. As a result, when the intake valve 21 opens, air flows with a high flow rate from the air intake passage into the cylinder 11 due to a pressure difference between the cylinder 11 and the air intake passage. In this way, if the negative overlap is provided, the flow rate of gas into the cylinder 11 is increased and gas fluidity in the cylinder 11 is kept high. Thus, the risk of auto-ignition can be reduced.

Further, the exhaust valve 22 is closed after the top dead center (while the piston descends). Therefore, when the intake valve 21 opens, the pressure in the cylinder 11 is easily made negative, further enhancing the gas fluidity.

In this way, in the range A (the range where the engine speed $N_{ENG}$ is low and the gas fluidity in the cylinder 11 tends to be low, and the range where the engine speed $N_{ENG}$ is high but the air charge amount $CE_D$ is small) in which combustion tends not to stabilize, the gas fluidity is increased by the negative overlap thereby acting to prevent the auto-ignition from occurring and improve combustion stabilization. Further, since the exhaust valve 22 is closed after the top dead center, pumping loss due to residual compressed gas can be reduced. That is, deterioration of engine efficiency can be avoided. The fourth engine speed N4 may be set to, for example, approximately 1000 rpm.

The more detailed control method for operation in the range A is described below.

Figure 10:
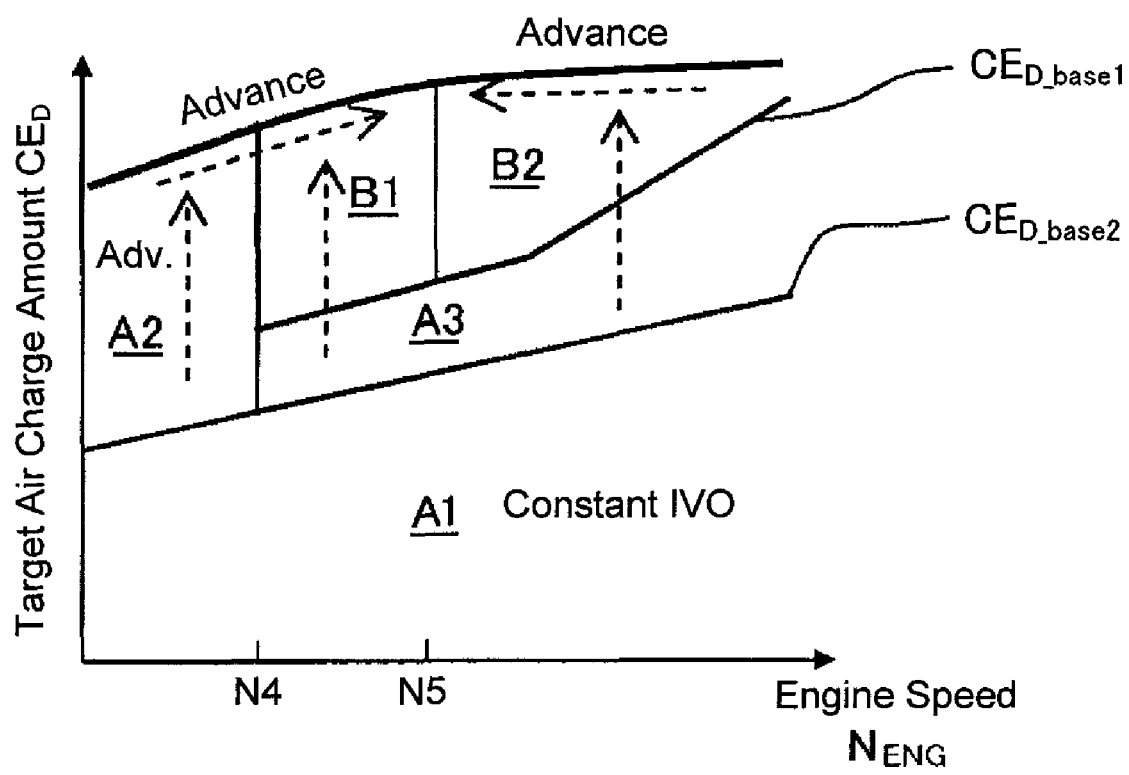
FIG. 10 is a graph showing an opening timing of the intake valve with respect to the engine speed and the target air charge amount.
Figure 11:
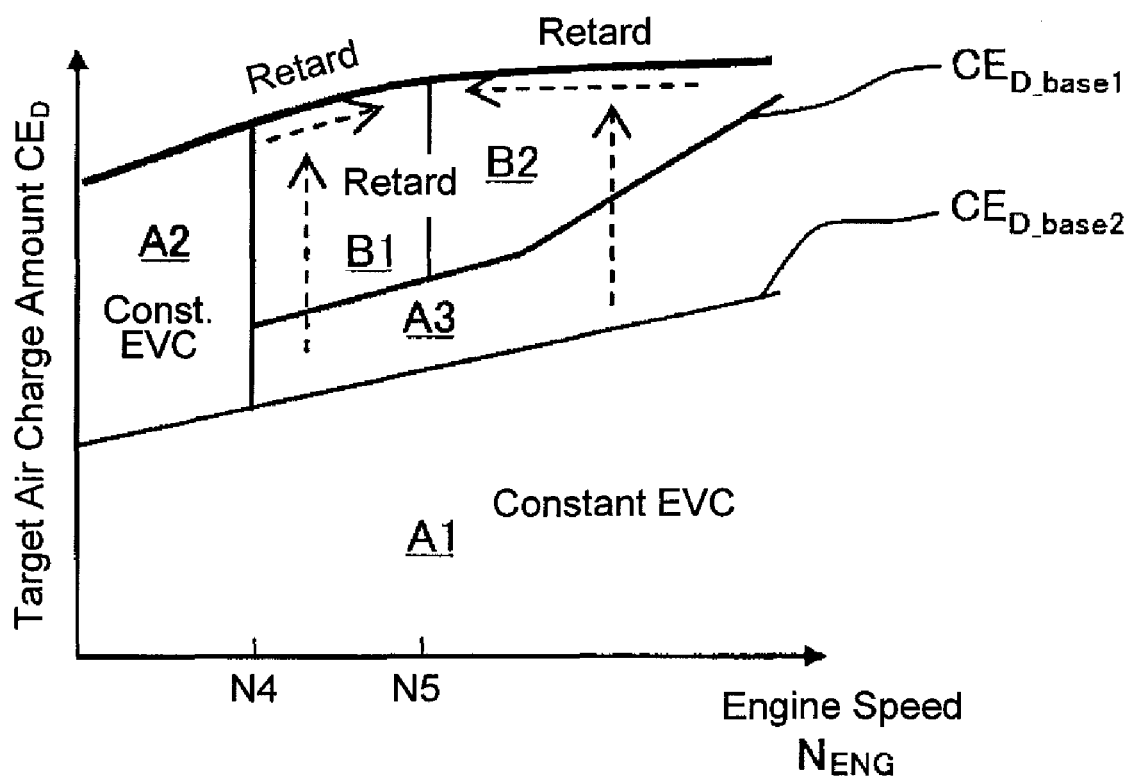
FIG. 11 is a graph showing a closing timing of the exhaust valve with respect to the engine speed and the target air charge amount.

Referring now to FIGS. 10-11, the range A includes ranges A1, A2, and A3. The range A1 includes a region where the target air charge amount $CE_D$ is smaller than a second reference air charge amount $CE_{D\_base2}$; here, the opening timing IVO of the intake valve 21 and the closing timing EVC of the exhaust valve 22 are controlled to be constant at a value with which the negative overlap occurs, and not to vary with operating conditions. For example, as shown in FIG. 13A, the closing timing EVC of the exhaust valve 22 is controlled to be around 5° CA ATDC, the opening timing IVO of the intake valve 21 is controlled to be around 35° CA ATDC, thus the negative overlap is controlled to be approximately 30° CA. Here, FIG. 10 shows an example of the opening timing IVO of the intake valve 21 relative to the engine speed $N_{ENG}$ and the target air charge amount $CE_D$, and represents that, in the direction of an arrow, the opening timing IVO is increasingly advanced. Further, FIGS. 13A-13D show examples of the closing timing EVC of the exhaust valve 22 and FIG. 11 shows the closing timing EVC of the exhaust valve 22 relative to the engine speed $N_{ENG}$ and the target air charge amount $CE_D$. In FIG. 11, the closing timing EVC is increasingly retarded in the direction of the single headed arrows. Further, a control value for the closing timing IVC of the intake valve 21 is not particularly limited, and, for example, if the timing is controlled to be around 100° CA ABDC and to be a timing where air in the cylinder 11 is blown back to the air intake passage, the air charge amount CE in the cylinder 11 can be made to be sufficiently small, in accordance with the target air charge amount $CE_D$.

Figure 12:
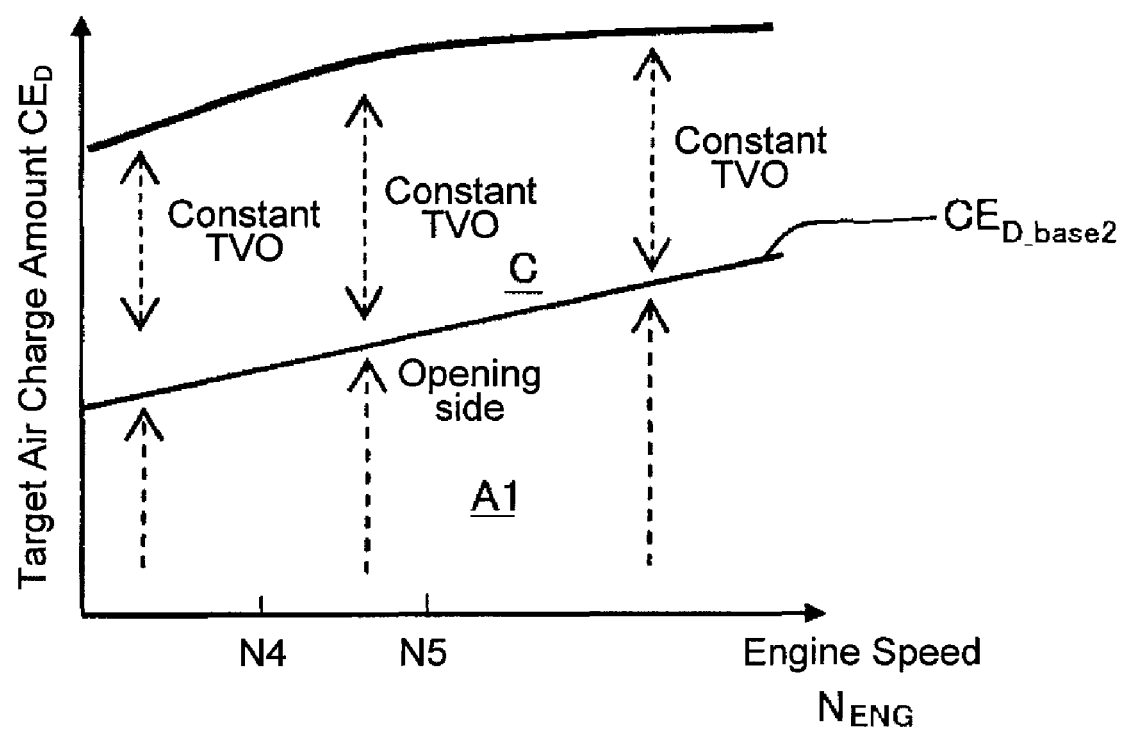
FIG. 12 is a graph showing an opening of the throttle valve with respect to the engine speed and the target air charge amount.

Then, in the range A1, as shown in FIG. 12, as the target air charge amount $CE_D$ increases, the throttle valve opening TVO is controlled to an open side, that is, to a side where the opening area of the air intake passage increases, appropriately controlling the air charge amount CE in the cylinder 11. FIG. 12 shows an example of the throttle valve opening TVO relative to the engine speed $N_{ENG}$ and the target air charge amount $CE_D$, and represents that, as indicated by the single headed arrows in range A1 on the opening side, the throttle valve opening TVO is controlled to be increasingly opened as the target air charge amount $CE_D$ increases at a given engine speed. However, as described later, in the range where the target air charge amount $CE_D$ is larger than the second reference air charge amount $CE_{D\_base2}$ (range C in FIG. 12), the throttle valve opening TVO is controlled to be constant for every engine speed $N_{ENG}$, and two-headed arrows in the range C in FIG. 12 represents that the throttle valve opening TVO is constant.

Referring to FIG. 10, the range A2 includes a range where the engine speed $N_{ENG}$ is smaller than the fourth engine speed N4 and the target air charge amount $CE_D$ is larger than the second reference air charge amount $CE_{D\_base2}$. In the range A2, the closing timing EVC of the exhaust valve 22 is controlled to be constant, and the open timing IVO of the intake valve 21 is controlled to be advanced as the target air charge amount $CE_D$ increases. This opening timing IVO of the intake valve 21 is controlled such that, for example, the opening timing IVO which is around 35° CA ATDC in the range A1 is advanced to around 15° CA ATDC in the full-load as shown in FIG. 13B. In this way, in this range A2, the open timing IVO of the intake valve 21 is advanced as the target air charge amount $CE_D$ increases to control the negative overlap period to be shorter, thereby shortening the negative overlap period. Thus, in this range A2, the open timing IVO of the intake valve 21 is retarded as the target air charge amount $CE_D$ decreases to control the negative overlap period to be longer, thereby lengthening the negative overlap period. That is, control is performed such that the gas fluidity in the cylinder 11 is maintained as the target air charge amount $CE_D$ decreases and combustion becomes more destabilized, improving combustion stabilization for the entire engine system.

Referring to FIG. 10, the range A3 includes a range where the engine speed $N_{ENG}$ is greater than the fourth engine speed N4, and the target air charge amount $CE_D$ is larger than the second reference air charge amount $CE_{D\_base2}$. In this range A3, the closing timing EVC of the exhaust valve 22 is retarded and the opening timing IVO of the intake valve 21 is controlled to be advanced as the target air charge amount $CE_D$ increases. In a condition where the target air charge amount $CE_D$ is the second reference air charge amount $CED_{\_base1}$, the closing timing EVC of the exhaust valve 22 coincides with the open timing IVO of the intake valve 21, and the negative overlap is 0 (zero).

Referring to FIG. 9, the range B includes a range where the engine speed $N_{ENG}$ is in the high-speed range of the fourth engine speed N4 or more, and the target air charge amount $CE_D$ is larger than the reference target air charge amount $CE_{D\_base1}$. In this range B, control is performed such that an overlap occurs in a valve opening period of the intake valve 21 and the exhaust valve 22. That is, a control is performed such that the intake valve 21 opens at the same time as the closing timing of the exhaust valve 22 or earlier. In the range B, since the engine speed $N_{ENG}$ and the air charge amount CE are sufficiently high, combustion is stabilized and the possibility of auto-ignition is small. Accordingly, in this range, the overlap is provided, securing an air amount in the cylinder 11 and output of the engine main body 1.

The more detailed method for controlling in this range B is described.

Referring to FIGS. 10-11, the range B includes ranges B1 and B2. The range B1 includes a range where the engine speed $N_{ENG}$ is lower than a fifth engine speed N5, and as the target air charge amount $CE_D$ increases in this range B1, the closing timing EVC of the exhaust valve 22 is controlled to be retarded, the opening timing IVO of the intake valve 21 is controlled to be advanced, and the exhaust valve 22 and the intake valve 21 overlap. As the engine speed $N_{ENG}$ increases even further, the closing timing EVC of the exhaust valve 22 is controlled to be more retarded, the opening timing IVO of the intake valve 21 is controlled to be more advanced, and the exhaust valve 22 and the intake valve 21 overlap more. For example, in the full-load where the engine speed $N_{ENG}$ is the fifth engine speed N5, as shown in FIG. 13C, the closing timing EVC of the exhaust valve 22 is controlled to be 25° CA ATDC, the opening timing IVO of the intake valve 21 is controlled to be 30° CA BTDC, and the overlap period is controlled to be 55° CA, which is the maximum overlap period under these and all other operating conditions (loads and engine speeds). In one example, the fifth engine speed N5 may be approximately 2000 rpm.

In this way, in a range B1, the overlap period increases as the engine speed $N_{ENG}$ increases and the target air charge amount $CE_D$ increases, improving scavenging action in the cylinder 11, and maintaining an amount of air inducted into the cylinder 11. Thus, this secures a desired output of the engine main body 1. Further, the improvement of scavenging action restricts the residual gas in the cylinder 11 to be small, to prevent knocking from occurring due to the increase of residual gas of high temperature (i.e., internal EGR gas).

In a case that the overlap period is provided, as described above, resulting effects can include improving scavenging action in the cylinder 11 and reducing the amount of the internal EGR gas. However, there is a possibility where, as a result of exhaust gas flowing into the air intake passage side, the amount of interior EGR gas in the cylinder 11 may increase. Therefore, with respect to FIG. 10, when operating in the range B2 (which includes a range where the engine speed $N_{ENG}$ is higher than the fifth engine speed N5), as the engine speed $N_{ENG}$ increases, the overlap period decreases to reduce the amount of the interior EGR gas. That is, the exhaust valve 22 closes and the intake valve 21 opens after the gas is completely exhausted such that the amount of the residual gas in the cylinder 11 is reduced. Specifically, in this range B2, as the engine speed $N_{ENG}$ increases, the closing timing EVC of the exhaust valve 22 is controlled to be advanced, and the opening timing IVO of the intake valve 21 is controlled to be retarded, to decrease the overlap period of the exhaust valve 22 and the intake valve 21. For example, in the full-load where the engine speed $N_{ENG}$ is substantially maximized, as shown in FIG. 13D, the closing timing EVC of the exhaust valve 22 is controlled to be around 10° CA ATDC, the opening timing IVO of the intake valve 21 is controlled to be around 10° CA ATDC, and the overlap period is controlled to be substantially 0 (zero).

In this way, in the range B2 of a high-speed and high-load range, the overlap period is reduced to restrict the internal EGR gas in the cylinder 11 and secure sufficient fresh air in the cylinder 11. This ensures the output of the engine main body 1.

Here, in all ranges (ranges A2, A3, B1 and B2) except for the range A1, the opening timing IVO of the intake valve 21 is advanced as the target air charge amount $CE_D$ increases. As described above, the opening period of the intake valve 21 is kept constant, and when the open timing IVO is advanced, the closing timing IVC of the intake valve 21 is advanced. Then, when this closing timing IVC of the intake valve 21 is advanced, the amount of air blowing back to the air intake passage decreases to increase the air charge amount CE in the cylinder 11. In this way, in the ranges except for the range A1, the opening and closing timings IVO and IVC of the intake valve 21 are controlled to be advanced such that the air charge amount CE in the cylinder 11 is appropriately kept in a state where the throttle valve opening TVO is kept constant and the pumping loss is suppressed.

With the control as described above, in this engine main body 1, in the low-speed range and in the low-load, that is, the low target air charge amount range, the intake valve 21 and the exhaust valve 22 are controlled to be in the negative overlap state to increase the gas fluidity in the cylinder 11, suppressing more surely the auto-ignition, and achieving stabilized combustion. Further, in the high-speed and high-load range, the intake valve 21 and the exhaust valve 22 are controlled to have no negative overlap to secure the air charge amount CE in the cylinder 11 and the output of the engine.

Alternatively, the control of the range B2 may be the same as that of the range B1. That is, by increasing the overlap as the engine speed increases under conditions in which effects from the improvement of scavenging action, owing to the greater overlap of the intake valve 21 and the exhaust valve 22, are greater than effects from the internal EGR owing to the greater overlap, the engine may secure new air.

In one case, the range where the negative overlap for the intake valve 21 and the exhaust valve 22 is provided may be only a range where the engine speed is N4 or less. However, combustion tends to be destabilized in an operation range where the target air charge amount $CE_D$ is small, independent of the engine speed. Therefore, if the negative overlap is provided for all engine speeds in the operation range where the target air charge amount $CE_D$ is small, combustion stability can be effectively improved.

Further, detailed constitutions of various actuators are not limited to those described above.

Further, specific values of the closing timing IVO of the intake valve 21, the closing timing EVC of the exhaust valve 22, the fourth engine speed N4, the fifth engine speed N5 and the like are not limited to those described above.

Furthermore, the intake valve 21 and the exhaust valve 22 may be controlled to have no negative overlap period at the full load condition over the entire engine speed range. Such control is applied on a third embodiment that will be described now.

The third embodiment has the engine system described above with reference to FIG. 1. The control procedure executed by the engine controller 100 is same as described above in terms of the second embodiment with reference to the flowchart in FIG. 8.

Figure 14:
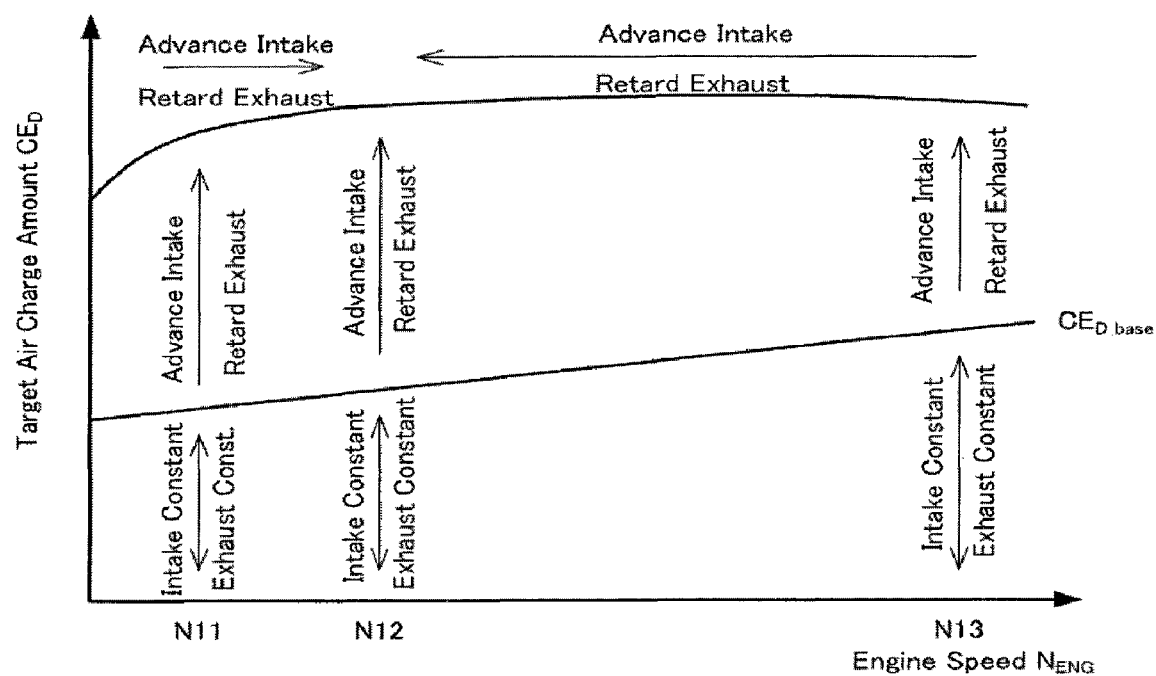
FIG. 14 is a graph showing angular phases of intake and exhaust camshaft with respect to the engine speed and the target air charge amount.
Figure 15:
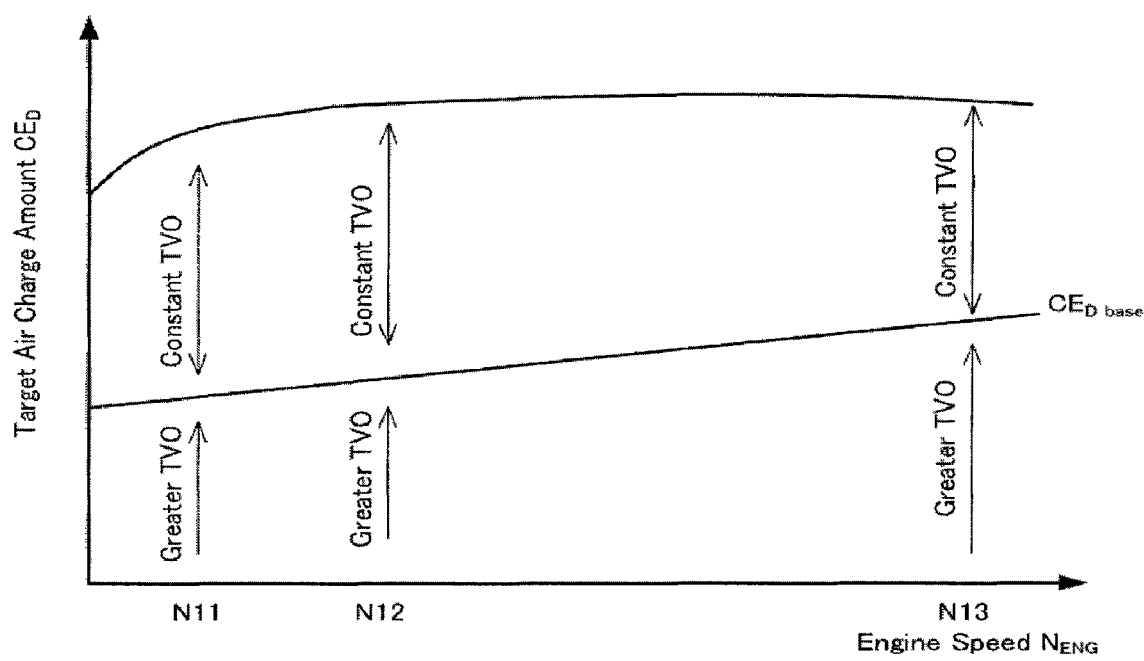
FIG. 15 is a graph showing an opening of the throttle valve with respect to the engine speed and the target air charge amount.

The engine controller 100 controls angular phases of the intake camshaft 31 and the exhaust camshaft 41 relative to the crankshaft 14 and the throttle valve opening as shown in FIGS. 14 through 16. As an example, the opening duration of the intake valve 21 is a constant of 250° CA, and the opening duration of the exhaust valve 22 is a constant of 225° CA.

As shown in FIG. 14, in an engine operating range where the engine speed $N_{ENG}$ is between N11 (for example, an idle speed such as 750 rpm) and N12 (for example, 2000 rpm) and the target air charge amount $CE_D$ is maximum, the angular phase of the intake camshaft 31 is advanced and the angular phase of the exhaust camshaft 41 is retarded as the engine speed $N_{ENG}$ increases.

On the other hand, in an operating range where the engine speed $N_{ENG}$ is greater than the speed N12, the angular phase of the intake camshaft 31 is advanced and the angular phase of the exhaust camshaft 41 is retarded as the engine speed $N_{ENG}$ decreases.

But, in both of the above operating ranges (e.g., N11-N12 and N12-N13), when the target air charge amount $CE_D$ is greater than a $CE_{D\_base}$ (which may be the same as in the first embodiment), the angular phase of the intake camshaft 31 is advanced and the angular phase of the exhaust camshaft 41 is retarded as the target air charge amount $CE_D$ increases. However, in this operating range, the throttle valve opening TVO is constant regardless the variation of the target air charge amount $CE_D$, as shown in FIG. 15.

Referring back to FIG. 14, on the other hand, when the target air charge amount $CE_D$ is the $CE_{D\_base}$ or less, the angular phase of the intake camshaft 31 and the angular phase of the exhaust camshaft 41 of the exhaust valve 22 are constant regardless the variations of the target air charge amount $CE_D$ and the engine speed $N_{ENG}$. However, in this operating range, the throttle valve opening TVO increases as the target air charge amount $CE_D$ increases as shown in FIG. 15.

Figure 16A:
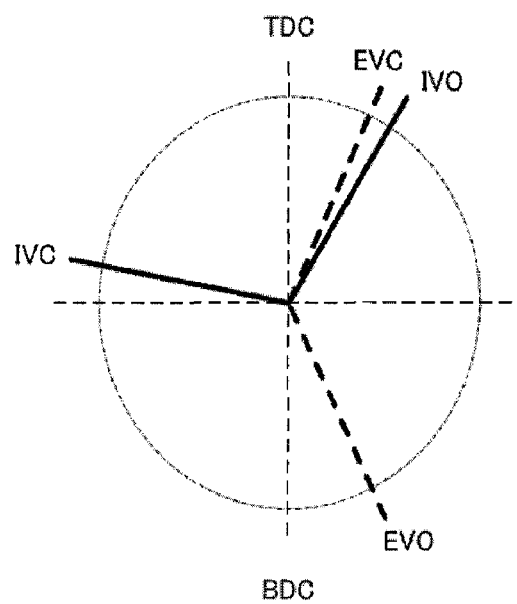
FIGS. 16A-16D are diagrams showing valve timings where

In the operating range where the target air charge amount $CE_D$ is the $CE_{D\_base}$ or less, the intake valve 21 opens at 30° CA ATDC and closes at 100° CA ABDC and the exhaust valve 31 opens at 25° CA BBDC (before bottom dead center) and closes at 20° CA ATDC as shown in FIG. 16A. Therefore, the intake valve 21 opens 5° CA after the exhaust valve 22 closes. Consequently, there is a negative overlap period in the lower load.

Figure 16B:
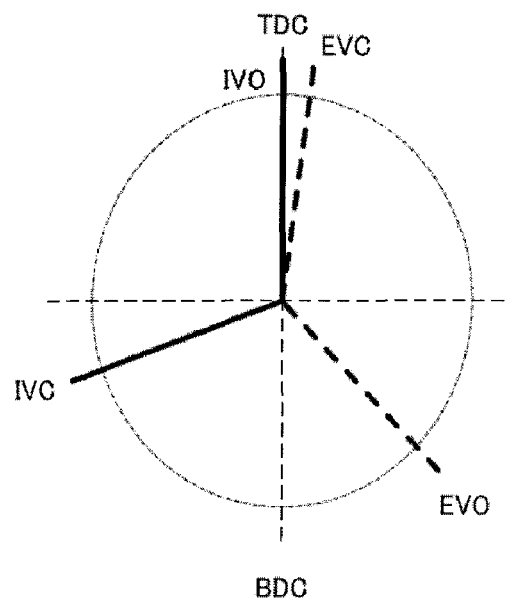

At the full load, when the engine speed $N_{ENG}$ is the speed N11, the intake valve 21 opens at TDC and closes at 70° CA ABDC and the exhaust valve 31 opens at 40° CA BBDC and 5° CA ATDC as shown in FIG. 16B. Therefore, there is no negative overlap period but a small positive overlap period.

Figure 16C:
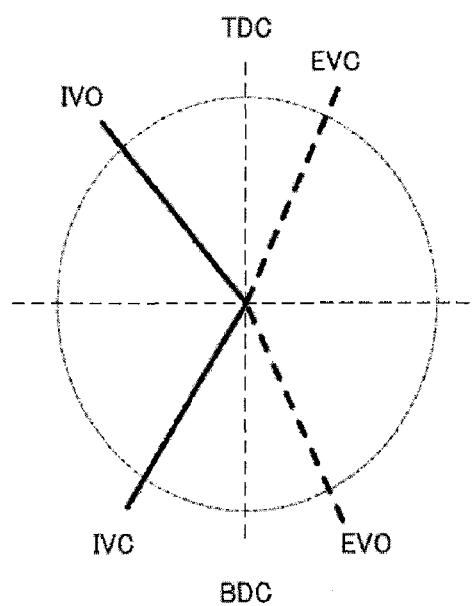
Figure 16D:
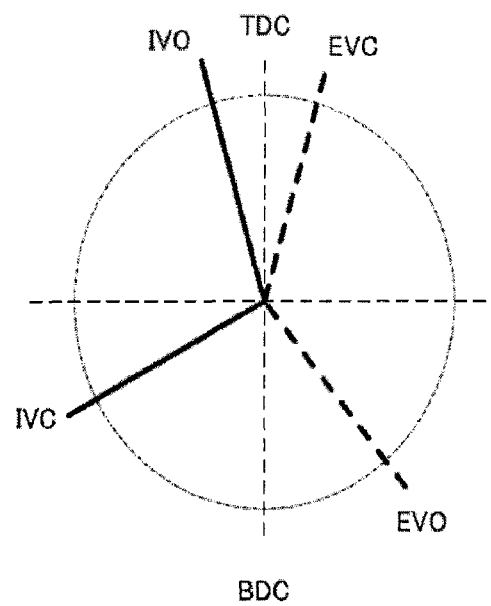

At the full load, as described above, the angular phase of the intake camshaft 31 is advanced and that of the exhaust camshaft 41 is retarded when the engine speed $N_{ENG}$ increases from N11 to N12. When the engine speed reaches N12, the intake valve 21 opens at 40° CA BTDC and closes at 30° ABDC and the exhaust valve opens at 25° CA BBDC and closes at 20° CA ATDC as shown in FIG. 16C. Therefore, as the engine speed $N_{ENG}$ increases from N11 to N12, the valve overlap period increases from 5° CA (as shown in FIG. 16A) to 60° CA.

Further on the full load, as described above, the angular phase of the intake camshaft 31 is retarded and that of the exhaust camshaft 41 is advanced when the engine speed $N_{ENG}$ increases from N12. When the engine speed reaches N13, which is, for example, 6000 rpm, the intake valve 21 opens at 10° CA BTDC and closes at 60° CA ABDC and the exhaust valve 22 opens at 35° CA BBDC and closes at 10° CA ATDC. Therefore, as the engine speed $N_{ENG}$ increases from N12 to N13, the valve overlap period decreases from 60° CA (as shown in FIG. 16C) to 20° CA.

As described above, this related technique provides a method for controlling an internal combustion engine having a cylinder accommodating a piston which reciprocates therein, and defining a combustion chamber, an air intake passage through which air is inducted into the cylinder, an intake valve shutting off air flowing into the cylinder from the air intake passage, an exhaust passage through which exhaust air is exhausted from the cylinder, and an exhaust valve shutting off exhaust air flowing into the exhaust passage from the cylinder, wherein in an operation range where an engine speed is a predefined first speed or less, at least in a full-load, after the exhaust valve closes, the intake valve opens after a top dead center; whereas, in an operation range where an engine speed is larger then the fourth speed, at least in the full-load, the intake valve opens before the exhaust valve closes.

According to this method, in the low-speed range where the auto-ignition tends to occur, in-cylinder gas fluidity can be enhanced to suppress occurrence of the auto-ignition, and in the high-speed range, the engine output can be secured. That is, in this method, in the low-speed range where the engine speed is the fourth speed or less, the intake valve opens after the exhaust valve closes and after the top dead center. While the in-cylinder pressure, in a substantially hermetically closed state, decreases as the piston descends, the intake valve opens; therefore, a flow rate of air flowing into the cylinder from the air intake passage is kept as a high value, increasing in-cylinder gas fluidity. Particularly, in this method, at least in the full-load range, the intake valve opens after the exhaust valve closes and after the top dead center; thus, the amount of air is large and the temperature at compression tends to rise. In this full-load range, occurrence of the auto-ignition is more surely suppressed. Meanwhile, in the high-speed range where the gas fluidity is secured, before the exhaust valve closes, the intake valve opens. Therefore, in-cylinder scavenging action is improved, and in-cylinder pressure decreases as the exhaust air flows out from the cylinder to allow intake air easily to flow in, increasing the amount of in-cylinder fresh air. Then, fuel corresponding thereto is combusted to secure the desired engine output.

Further, this technique provides a method for controlling an internal combustion engine having a cylinder accommodating a piston which reciprocates therein, and defining a combustion chamber, an air intake passage through which air is inducted into the cylinder, an intake valve shutting off air flowing into the cylinder from the air intake passage, an exhaust passage through which exhaust air is exhausted from the cylinder, and an exhaust valve shutting off exhaust air flowing into the exhaust passage from the cylinder, wherein in an operation range where an engine speed is a predefined fourth speed or less, the intake valve opens after the exhaust valve closes after the top dead center; whereas in an operation range where an engine speed is larger than the fourth speed, the intake valve opens before the exhaust valve closes.

According to this method, in the low-speed range where the auto-ignition tends to occur, in-cylinder gas fluidity can be enhanced to suppress occurrence of the auto-ignition, and in the high-speed range, the engine output can be secured. That is, in this method, in the low-speed range where the engine speed is the fourth speed or less, the intake valve opens after the exhaust valve closes after the top dead center. The in-cylinder pressure, in a substantially hermetically closed state, decreases by closing both the exhaust valve and the intake valve as the piston descends, and then the intake valve opens. Therefore, the flow rate of air flowing into the cylinder from the air intake passage is kept at a high value, increasing in-cylinder gas fluidity. Particularly, in this method, the exhaust valve closes after the top dead center (while the piston descends); thus, in-cylinder pressure at the open timing of the intake valve, is negative, to surely improve the gas fluidity. Further, pumping loss due to in-cylinder residual gas compression can be suppressed, improving the engine efficiency. On the other hand, in the high-speed range where the gas fluidity is already secured, the intake valve opens before the exhaust valve closes to improve in-cylinder scavenging action, ensuring an amount of in-cylinder new air and the desired engine output.

In addition, in this related technique, in an operation range where an engine speed is a fifth speed or more and larger than the fourth speed, the larger the engine speed, the shorter the period when both the exhaust valve and the intake valve are open.

According to this, particularly in an operation range where the engine speed is high, residual air in an interior EGR is suppressed and an amount of new in-cylinder air and the desired engine output are secured.

Further, in this related technique, in an operation range where an engine speed is the fourth speed or less, the smaller the target air charge amount, which is a target value of an amount of air inducted into the cylinder, the longer the period from exhaust valve closing to intake valve opening.

As the period from exhaust valve closing to intake valve opening lengthens, the intake valve opens after in-cylinder pressure is more decreased; thus, air fluidity is enhanced. Therefore, if the period lengthens such that combustion is made relatively destabilized with the target air charge amount being small as per this method, combustion is more surely secured for each target air charge amount.

Further, in this related technique, of the operation ranges where an engine speed is the fourth speed or more, in a range where the target air charge amount (which is a target value of an amount of air inducted into the cylinder) is smaller than a predefined reference air charge amount, the intake valve opens after the exhaust valve closes after the top dead center. In an operation range where the target air charge amount $CE_D$ is small, since combustion tends to be destabilized independent of the engine speed, if the negative overlap is provided for all the engine speeds in the range where the target air charge amount $CE_D$ is small, combustion stabilization can be effectively improved.

Further, in this related technique, a method is shown in which an opening timing of the intake valve in an operation range where an engine speed is the fourth speed or more is controlled to be advanced more than an opening timing of the intake valve in an operation range where an engine speed is the fourth speed or less, and a closing timing of the exhaust valve in an operation range where an engine speed is the fourth speed or more is controlled to be retarded more than a closing timing of the exhaust valve in an operation range where an engine speed is the fourth speed or less. Additionally, in this method, control can be achieved in which in the operation range where the engine speed is the fourth speed or less, the intake valve opens after the top dead center after the exhaust valve closes, whereas in the operation range where the engine speed is larger than the fourth speed, the intake valve opens before the exhaust valve closes, with the variation amount of the closing timing of the intake valve and the closing timing of the exhaust valve each being restricted to be small.

Further, this reference technique provides a system of controlling an internal combustion engine having a cylinder accommodating a piston which reciprocates therein, and defining a combustion chamber, an air intake passage through which air is inducted into the cylinder, an intake valve shutting off air flowing into the cylinder from the air intake passage, an exhaust passage through which exhaust air is exhausted from the cylinder, and an exhaust valve shutting off exhaust air flowing into the exhaust passage from the cylinder, wherein the system includes a valve driving mechanism configured to cyclically open and close the intake valve and exhaust valve, and a control module configured to control the valve driving mechanism to: open the intake valve after the exhaust valve closes at least in a full-load range in an operation range where an engine speed is a predetermined fourth speed or less; and open the intake valve before the exhaust valve closes at least in the full-load range in an operation range where an engine speed is larger than the fourth speed, and further, the control module is configured to control the valve driving mechanism to: close the exhaust valve after top dead center, and open the intake valve after the exhaust valve closes in an operation range where an engine speed is the predetermined fourth speed or less; and open the intake valve before the exhaust valve closes in an operation range where an engine speed is larger than the fourth speed.

Here, in the internal combustion engine with a high compression ratio and a geometric compression ratio of the cylinder of 13 or more, the in-cylinder temperature tends to rise due to compression and there is a high possibility of auto-ignition occurring. Therefore, it is effective to apply the control system of the internal combustion engine, discussed herein, to such internal combustion engines with high compression ratios.

Accordingly, this related technique can also provide a method for controlling the internal combustion engine which can improve in-cylinder gas fluidity and suppress auto-ignition.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A method of controlling an internal combustion engine having a cylinder accommodating a piston which reciprocates therein, and defining a combustion chamber, an air intake passage through which air is inducted into said cylinder, and an intake valve capable of shutting off air flowing into said cylinder from said air intake passage, the method comprising:
    closing the intake valve in a manner such that a timing of the closing of the air intake valve is retarded beyond a timing at which an amount of air inducted into the cylinder would be maximized, and the timing of the closing of the air intake valve is advanced as a desired amount of air to be inducted into the cylinder increases while the engine speed is at a predetermined engine speed; and
    closing the intake valve in a manner such that a timing of the closing of the air intake valve is advanced as the engine speed increases, when the desired amount of air to be inducted into the cylinder is at a maximum.

2. A method of controlling an internal combustion engine having a cylinder accommodating a piston which reciprocates therein, and defining a combustion chamber, an air intake passage through which air is inducted into said cylinder, and an intake valve capable of shutting off air flowing into said cylinder from said air intake passage, the method comprising:
    closing said intake valve later during a cylinder cycle than a timing with which an amount of air inducted into said cylinder from said air intake passage would be maximized, and earlier during the cylinder cycle as a desired amount of air to be inducted into said cylinder increases, while an engine speed of the engine is at a given engine speed; and
    closing said intake valve earlier during a cylinder cycle as the engine speed increases when said desired amount of air to be inducted into said cylinder is at a maximum.

3. The method of claim 1, further comprising closing said intake valve at a substantially fixed timing when the desired amount of air to be inducted into said cylinder is less than or equal to a predefined air amount.

4. The method of claim 3, further comprising increasing a pressure in said air intake passage as the desired amount of air to be inducted into said cylinder increases when the desired amount of air to be inducted into said cylinder is less than or equal to said predefined air amount.

5. The method of claim 1, further comprising opening said intake valve earlier during a cylinder cycle and closing an exhaust valve of said cylinder later during said cylinder cycle as the engine speed increases when the engine speed is less than or equal to a second predetermined speed and the desired amount of air to be inducted into said cylinder is at a maximum at the given engine speed.

6. The method of claim 5, wherein said exhaust valve closes before said intake valve opens during the cylinder cycle if the engine speed is a third predetermined speed or less when the desired amount of air inducted into said cylinder is at a maximum at the given engine speed.

7. The method of claim 2, further comprising:
    closing said intake valve earlier during a cylinder cycle as the engine speed increases when the engine speed is a first predetermined speed or less and said desired amount of air to be inducted into said cylinder is at a maximum; and
    closing said intake valve later during a cylinder cycle as the engine speed increases when the engine speed is greater than said first predetermined speed and the desired amount of air to be inducted into said cylinder is at a maximum at the given engine speed.

8. The method of claim 7, further comprising closing said intake valve at a substantially fixed timing when the desired amount of air to be inducted into said cylinder is a predefined air amount or less.

9. The method of claim 8, further comprising increasing a pressure in said air intake passage as the desired amount of air to be inducted into said cylinder increases when the desired amount of air to be inducted into said cylinder is less than or equal to said predefined air amount.

10. The method of claim 7, further comprising opening said intake valve earlier during a cylinder cycle and closing an exhaust valve of said cylinder later during said cylinder cycle as the engine speed increases when the engine speed is less than or equal to a second predetermined speed and the desired amount of air to be inducted into said cylinder is at a maximum at the given engine speed.

11. The method of claim 10, wherein said exhaust valve closes before said intake valve opens during the cylinder cycle if the engine speed is less than or equal to a third predetermined speed when the desired amount of air inducted into said cylinder is at a maximum at the given engine speed.

12. A system comprising:
    an internal combustion engine having a cylinder accommodating a piston which reciprocates therein, and defining a combustion chamber, an air intake passage through which air is inducted into said cylinder, and an intake valve capable of shutting off air flowing into said cylinder from said air intake passage;
    an intake valve driving mechanism which is configured to cyclically open and close said intake valve; and
    a controller configured to control said intake valve driving mechanism to:
    close said intake valve later during a cylinder cycle than a timing with which an amount of air inducted into said cylinder from said air intake passage would be maximized, and earlier during the cylinder cycle as a desired amount of air inducted into said cylinder increases while an engine speed of the engine is at a given engine speed; and close said intake valve earlier during the cylinder cycle as the engine speed increases when a desired amount of air inducted into said cylinder is at a maximum at the given engine speed.

13. The system of claim 12, wherein said internal combustion engine has a geometric compression ratio of 13:1 or greater.

14. The system of claim 12,
wherein said intake valve driving mechanism comprises a camshaft which is driven by a crankshaft that is coupled to said piston and drives said intake valve, and a phase changing mechanism which changes an angular phase of said camshaft relative to an angular phase of said crankshaft,
and wherein said controller varies closing timings of said intake valve by actuating said phase changing mechanism.

15. The system of claim 12, wherein said controller is further configured to control said intake valve driving mechanism to close said intake valve at a substantially fixed timing when the desired amount of air to be inducted into said cylinder is less than or equal to a predefined air amount.

16. The system of claim 15, further comprising a throttle valve which is arranged in said air intake passage and capable of varying an opening area of said air intake passage, and a throttle actuator which actuates said throttle valve,
and wherein said controller is further configured to control said throttle actuator to increase the opening area of said air intake passage when the desired amount of air to be inducted into said cylinder is less than or equal to said predefined air amount.

17. The system of claim 12,
wherein said controller is further configured to control said intake valve driving mechanism to:
close said intake valve earlier during a cylinder cycle as the engine speed increases when the engine speed is less than or equal to a first predetermined speed and the desired amount of air to be inducted into said cylinder is at a maximum at the given engine speed; and
close said intake valve later during a cylinder cycle as the engine speed increases when the engine speed is greater than said first predetermined speed and the desired amount of air to be inducted into said cylinder is at a maximum at the given engine speed.

18. The system of claim 17, wherein said internal combustion engine has a geometric compression ratio of 13:1 or greater.

19. The system of claim 17, wherein said intake valve driving mechanism comprises a camshaft which is driven by a crankshaft that is coupled to said piston and drives said intake valve, and a phase changing mechanism which changes an angular phase of said camshaft relative to an angular phase of said crankshaft, and wherein said controller varies closing timings of said intake valve by actuating said phase changing mechanism.

20. The system of claim 17, wherein said controller is further configured to control said intake valve driving mechanism to close said intake valve at a substantially fixed timing when the desired amount of air to be inducted into said cylinder is less than or equal to a predefined air amount.

21. The system of claim 20, further comprising a throttle valve which is arranged in said air intake passage and capable of varying an opening area of said air intake passage, and a throttle actuator which actuates said throttle valve,
and wherein said controller is further configured to control said throttle actuator to increase the opening area of said air intake passage when the desired amount of air to be inducted into said cylinder is less than or equal to said predefined air amount.

* * * * *